US012767891B2

(12) United States Patent
Enya

(10) Patent No.: US 12,767,891 B2
(45) Date of Patent: Oct. 20, 2026

(54) LIGHT CONTROL SHEET, METHOD FOR PRODUCING LIGHT CONTROL SHEET, AND LIQUID CRYSTAL COMPOSITION FOR POLYMER DISPERSION

(71) Applicant: TOPPAN Inc., Tokyo (JP)

(72) Inventor: Taisuke Enya, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 18/471,553

(22) Filed: Sep. 21, 2023

(65) Prior Publication Data

US 2024/0010917 A1 Jan. 11, 2024

Related U.S. Application Data

(63) Continuation of application No. PCT/JP2022/013928, filed on Mar. 24, 2022.

(30) Foreign Application Priority Data

Mar. 24, 2021 (JP) ................................ 2021-049982

(51) Int. Cl.

*G02F 1/1333* (2006.01)
*C09K 19/54* (2006.01)
*G02F 1/1334* (2006.01)
*G02F 1/1343* (2006.01)

(52) U.S. Cl.

CPC .......... *C09K 19/544* (2013.01); *G02F 1/1334* (2013.01); *G02F 1/13439* (2013.01)

(58) Field of Classification Search

CPC .. G02F 1/1333; G02F 1/1334; G02F 1/13439; C09K 19/02; C09K 19/38; C09K 19/54
See application file for complete search history.

(56) References Cited

U.S. PATENT DOCUMENTS

2024/0010917 A1* 1/2024 Enya .................. G02F 1/13439
2024/0361642 A1* 10/2024 Matsubara .............. G02F 1/137
2024/0361660 A1* 10/2024 Yoshida ................ G02F 1/1334

FOREIGN PATENT DOCUMENTS

EP 0 421 240 B1 1/1996
JP 7-17910 B2 3/1995
JP 2000-098358 A 4/2000
JP 2018-045135 A 3/2018
WO WO-2017180923 A1 * 10/2017 ............ C09K 19/12

OTHER PUBLICATIONS

International Search Report issued May 24, 2022 in PCT/JP2022/013928 filed Mar. 24, 2022, 5 pages.
European Office Action issued Mar. 6, 2025 in European Patent Application No. 22775767.1, 22 pages.

* cited by examiner

*Primary Examiner* — Geraldina Visconti
(74) *Attorney, Agent, or Firm* — Oblon, McClelland, Maier & Neustadt, L.L.P.

(57) ABSTRACT

A light control sheet includes an organic polymer layer that partitions voids, and a liquid crystal composition that contains a non-polymerizable liquid crystal compound and fills the voids. The light control sheet changes the transmittance to visible light by driving the non-polymerizable liquid crystal compound. The liquid crystal composition contains adipate as a non-polymerizable viscosity-reducing agent, and the weight of the non-polymerizable viscosity-reducing agent relative to the weight of the non-polymerizable liquid crystal compound is 1% or more.

12 Claims, 7 Drawing Sheets

FIG.3

| | | | EXAMPLE | | | | | | | | | |
|---|---|---|---|---|---|---|---|---|---|---|---|---|
| | | | 1 | 2 | 3 | 4 | 5 | 6 | 7 | 8 | 9 | 10 |
| FORMULATION RATIO (wt%) | LIQUID CRYSTAL | LCM | 50.0 | 50.0 | 50.0 | 50.0 | 50.0 | 50.0 | 50.0 | 50.0 | 50.0 | 50.0 |
| | POLYMERIZABLE UNSATURATED COMPOUND | M1 | 28.8 | 28.8 | 28.8 | 28.8 | 28.8 | 28.8 | 28.5 | 28.5 | 28.5 | 28.5 |
| | | M2 | 6.0 | 6.0 | 6.0 | 6.0 | 6.0 | 6.0 | 6.0 | 6.0 | 6.0 | 6.0 |
| | | M3 | 12.8 | 12.8 | 12.8 | 12.8 | 12.8 | 12.8 | 12.5 | 12.5 | 12.5 | 12.5 |
| | NON-POLYMERIZABLE ADDITIVE | NPA1 | 0.5 | 0 | 0 | 0 | 0 | 0 | 1.0 | 0 | 0 | 0 |
| | | NPA2 | 0 | 0.5 | 0 | 0 | 0 | 0 | 0 | 1.0 | 0 | 0 |
| | | NPA3 | 0 | 0 | 0.5 | 0 | 0 | 0 | 0 | 0 | 1.0 | 0 |
| | | NPA4 | 0 | 0 | 0 | 0.5 | 0 | 0 | 0 | 0 | 0 | 1.0 |
| | | NPA5 | 0 | 0 | 0 | 0 | 0.5 | 0 | 0 | 0 | 0 | 0 |
| | | NPA6 | 0 | 0 | 0 | 0 | 0 | 0.5 | 0 | 0 | 0 | 0 |
| | | NPA7 | 0 | 0 | 0 | 0 | 0 | 0 | 0 | 0 | 0 | 0 |
| | | NPA8 | 0 | 0 | 0 | 0 | 0 | 0 | 0 | 0 | 0 | 0 |
| | | NPA9 | 0 | 0 | 0 | 0 | 0 | 0 | 0 | 0 | 0 | 0 |
| | | NPA10 | 0 | 0 | 0 | 0 | 0 | 0 | 0 | 0 | 0 | 0 |
| | | NPA11 | 0 | 0 | 0 | 0 | 0 | 0 | 0 | 0 | 0 | 0 |
| | | NPA12 | 0 | 0 | 0 | 0 | 0 | 0 | 0 | 0 | 0 | 0 |
| | POLYMERIZABLE ADDITIVE | MA1 | 0 | 0 | 0 | 0 | 0 | 0 | 0 | 0 | 0 | 0 |
| | | MA2 | 0 | 0 | 0 | 0 | 0 | 0 | 0 | 0 | 0 | 0 |
| | | MA3 | 0 | 0 | 0 | 0 | 0 | 0 | 0 | 0 | 0 | 0 |
| | INITIATOR | PI1 | 1.0 | 1.0 | 1.0 | 1.0 | 1.0 | 1.0 | 1.0 | 1.0 | 1.0 | 1.0 |
| | SPACER | | 1.0 | 1.0 | 1.0 | 1.0 | 1.0 | 1.0 | 1.0 | 1.0 | 1.0 | 1.0 |
| HAZE (%) | NO VOLTAGE APPLIED | -20° C | 97 | 97 | 97 | 97 | 97 | 97 | 97 | 97 | 97 | 97 |
| | | -10° C | 97 | 97 | 97 | 97 | 97 | 97 | 97 | 97 | 97 | 97 |
| | | 0° C | 97 | 97 | 97 | 97 | 97 | 97 | 97 | 97 | 97 | 97 |
| | | 23° C | 97 | 97 | 97 | 97 | 97 | 97 | 97 | 97 | 97 | 97 |
| | | 90° C | 96 | 96 | 96 | 96 | 96 | 96 | 94 | 95 | 94 | 95 |
| | | 100° C | 94 | 94 | 94 | 94 | 94 | 94 | 93 | 93 | 92 | 94 |
| | | DIFFERENCE (BETWEEN 23° C and 90° C) | 1 | 1 | 1 | 1 | 1 | 1 | 3 | 2 | 3 | 2 |
| | VOLTAGE APPLIED | -20° C | 5.7 | 5.6 | 5.8 | 5.7 | 5.6 | 6.0 | 5.0 | 5.0 | 5.0 | 4.9 |
| | | -10° C | 5.3 | 5.2 | 5.3 | 5.1 | 5.2 | 5.8 | 4.9 | 4.9 | 4.8 | 4.8 |
| | | 0° C | 4.7 | 4.8 | 4.7 | 4.6 | 4.7 | 4.8 | 4.7 | 4.8 | 4.7 | 4.6 |
| | | 23° C | 4.7 | 4.7 | 4.6 | 4.7 | 4.6 | 4.7 | 4.6 | 4.7 | 4.7 | 4.5 |
| | | 90° C | 4.8 | 4.9 | 4.5 | 4.6 | 4.8 | 4.9 | 4.9 | 4.9 | 4.6 | 4.6 |
| | | 100° C | 4.8 | 4.8 | 4.7 | 4.8 | 4.7 | 4.8 | 4.7 | 4.7 | 4.8 | 4.7 |
| RESPONSE TIME (SEC) | ON OPERATION | -20° C | 1 | 1 | 1 | 1 | 1 | 1 | 1 | 1 | 1 | 1 |
| | | -10° C | 1 | 1 | 1 | 1 | 1 | 1 | 1 | 1 | 1 | 1 |
| | | 23° C | 1 | 1 | 1 | 1 | 1 | 1 | 1 | 1 | 1 | 1 |
| | OFF OPERATION | -20° C | 2 | 2 | 2 | 2 | 2 | 2 | 1 | 1 | 1 | 1 |
| | | -10° C | 5 | 5 | 5 | 5 | 5 | 5 | 4 | 4 | 4 | 4 |
| | | 23° C | 1 | 1 | 1 | 1 | 1 | 1 | 1 | 1 | 1 | 1 |
| | | DIFFERENCE (BETWEEN -20° C and 23° C) | 1 | 1 | 1 | 1 | 1 | 1 | 0 | 0 | 0 | 0 |

FIG.4

| | | | EXAMPLE | | | | | | | | | |
|---|---|---|---|---|---|---|---|---|---|---|---|---|
| | | | 11 | 12 | 13 | 14 | 15 | 16 | 17 | 18 | 19 | 20 |
| FORMULATION RATIO (wt%) | LIQUID CRYSTAL | LCM | 50.0 | 50.0 | 50.0 | 50.0 | 50.0 | 50.0 | 50.0 | 50.0 | 50.0 | 50.0 |
| | POLYMERIZABLE UNSATURATED COMPOUND | M1 | 28.5 | 28.5 | 28.0 | 28.0 | 28.0 | 28.0 | 28.0 | 28.0 | 27.5 | 27.5 |
| | | M2 | 6.0 | 6.0 | 6.0 | 6.0 | 6.0 | 6.0 | 6.0 | 6.0 | 6.0 | 6.0 |
| | | M3 | 12.5 | 12.5 | 12.0 | 12.0 | 12.0 | 12.0 | 12.0 | 12.0 | 11.5 | 11.5 |
| | NON-POLYMERIZABLE ADDITIVE | NPA1 | 0 | 0 | 2.0 | 0 | 0 | 0 | 0 | 0 | 3.0 | 0 |
| | | NPA2 | 0 | 0 | 0 | 2.0 | 0 | 0 | 0 | 0 | 0 | 3.0 |
| | | NPA3 | 0 | 0 | 0 | 0 | 2.0 | 0 | 0 | 0 | 0 | 0 |
| | | NPA4 | 0 | 0 | 0 | 0 | 0 | 2.0 | 0 | 0 | 0 | 0 |
| | | NPA5 | 1.0 | 0 | 0 | 0 | 0 | 0 | 2.0 | 0 | 0 | 0 |
| | | NPA6 | 0 | 1.0 | 0 | 0 | 0 | 0 | 0 | 2.0 | 0 | 0 |
| | | NPA7 | 0 | 0 | 0 | 0 | 0 | 0 | 0 | 0 | 0 | 0 |
| | | NPA8 | 0 | 0 | 0 | 0 | 0 | 0 | 0 | 0 | 0 | 0 |
| | | NPA9 | 0 | 0 | 0 | 0 | 0 | 0 | 0 | 0 | 0 | 0 |
| | | NPA10 | 0 | 0 | 0 | 0 | 0 | 0 | 0 | 0 | 0 | 0 |
| | | NPA11 | 0 | 0 | 0 | 0 | 0 | 0 | 0 | 0 | 0 | 0 |
| | | NPA12 | 0 | 0 | 0 | 0 | 0 | 0 | 0 | 0 | 0 | 0 |
| | POLYMERIZABLE ADDITIVE | MA1 | 0 | 0 | 0 | 0 | 0 | 0 | 0 | 0 | 0 | 0 |
| | | MA2 | 0 | 0 | 0 | 0 | 0 | 0 | 0 | 0 | 0 | 0 |
| | | MA3 | 0 | 0 | 0 | 0 | 0 | 0 | 0 | 0 | 0 | 0 |
| | INITIATOR | PI1 | 1.0 | 1.0 | 1.0 | 1.0 | 1.0 | 1.0 | 1.0 | 1.0 | 1.0 | 1.0 |
| | SPACER | | 1.0 | 1.0 | 1.0 | 1.0 | 1.0 | 1.0 | 1.0 | 1.0 | 1.0 | 1.0 |
| HAZE (%) | NO VOLTAGE APPLIED | -20° C | 97 | 97 | 97 | 97 | 97 | 97 | 97 | 97 | 97 | 97 |
| | | -10° C | 97 | 97 | 97 | 97 | 97 | 97 | 97 | 97 | 97 | 97 |
| | | 0° C | 97 | 97 | 97 | 97 | 97 | 97 | 97 | 97 | 97 | 97 |
| | | 23° C | 97 | 97 | 97 | 97 | 97 | 97 | 97 | 97 | 97 | 97 |
| | | 90° C | 94 | 94 | 94 | 93 | 94 | 95 | 93 | 94 | 90 | 90 |
| | | 100° C | 92 | 92 | 91 | 91 | 92 | 92 | 91 | 91 | 87 | 87 |
| | | DIFFERENCE (BETWEEN 23° C and 90° C) | 3 | 3 | 3 | 4 | 3 | 2 | 4 | 3 | 7 | 7 |
| | VOLTAGE APPLIED | -20° C | 5.0 | 5.8 | 4.8 | 4.8 | 4.7 | 4.7 | 4.8 | 5.4 | 4.6 | 4.6 |
| | | -10° C | 4.9 | 5.4 | 4.6 | 4.6 | 4.6 | 4.5 | 4.6 | 5.2 | 4.3 | 4.2 |
| | | 0° C | 4.7 | 4.6 | 4.5 | 4.5 | 4.5 | 4.6 | 4.4 | 4.4 | 4.1 | 4.1 |
| | | 23° C | 4.6 | 4.5 | 4.5 | 4.5 | 4.5 | 4.4 | 4.3 | 4.3 | 4.2 | 4.0 |
| | | 90° C | 4.8 | 4.7 | 4.3 | 4.3 | 4.4 | 4.5 | 4.4 | 4.4 | 4.1 | 4.0 |
| | | 100° C | 4.9 | 4.8 | 4.4 | 4.4 | 4.5 | 4.4 | 4.3 | 4.3 | 4.0 | 3.9 |
| RESPONSE TIME (SEC) | ON OPERATION | -20° C | 1 | 1 | 1 | 1 | 1 | 1 | 1 | 1 | 1 | 1 |
| | | -10° C | 1 | 1 | 1 | 1 | 1 | 1 | 1 | 1 | 1 | 1 |
| | | 23° C | 1 | 1 | 1 | 1 | 1 | 1 | 1 | 1 | 1 | 1 |
| | OFF OPERATION | -20° C | 1 | 1 | 1 | 1 | 1 | 1 | 1 | 1 | 1 | 1 |
| | | -10° C | 4 | 4 | 3 | 3 | 3 | 3 | 3 | 3 | 2 | 2 |
| | | 23° C | 1 | 1 | 1 | 1 | 1 | 1 | 1 | 1 | 1 | 1 |
| | | DIFFERENCE (BETWEEN -20° C and 23° C) | 0 | 0 | 0 | 0 | 0 | 0 | 0 | 0 | 0 | 0 |

FIG.5

| | | | EXAMPLE | | | | | | | | | |
|---|---|---|---|---|---|---|---|---|---|---|---|---|
| | | | 21 | 22 | 23 | 24 | 25 | 26 | 27 | 28 | 29 | 30 |
| FORMULATION RATIO (wt%) | LIQUID CRYSTAL | LCM | 50.0 | 50.0 | 50.0 | 50.0 | 50.0 | 50.0 | 50.0 | 50.0 | 50.0 | 50.0 |
| | POLYMERIZABLE UNSATURATED COMPOUND | M1 | 27.5 | 27.5 | 27.5 | 27.5 | 27.5 | 27.5 | 27.5 | 27.5 | 27.5 | 27.5 |
| | | M2 | 6.0 | 6.0 | 6.0 | 6.0 | 6.0 | 6.0 | 6.0 | 6.0 | 6.0 | 6.0 |
| | | M3 | 11.5 | 11.5 | 11.5 | 11.5 | 11.5 | 11.5 | 11.5 | 11.5 | 11.5 | 11.5 |
| | NON-POLYMERIZABLE ADDITIVE | NPA1 | 0 | 0 | 0 | 0 | 0 | 0 | 0 | 0 | 0 | 0 |
| | | NPA2 | 0 | 0 | 0 | 0 | 0 | 0 | 0 | 0 | 0 | 0 |
| | | NPA3 | 3.0 | 0 | 0 | 0 | 0 | 0 | 0 | 0 | 0 | 0 |
| | | NPA4 | 0 | 3.0 | 0 | 0 | 0 | 0 | 0 | 0 | 0 | 0 |
| | | NPA5 | 0 | 0 | 3.0 | 0 | 0 | 0 | 0 | 0 | 0 | 0 |
| | | NPA6 | 0 | 0 | 0 | 3.0 | 0 | 0 | 0 | 0 | 0 | 0 |
| | | NPA7 | 0 | 0 | 0 | 0 | 3.0 | 0 | 0 | 0 | 0 | 0 |
| | | NPA8 | 0 | 0 | 0 | 0 | 0 | 3.0 | 0 | 0 | 0 | 0 |
| | | NPA9 | 0 | 0 | 0 | 0 | 0 | 0 | 3.0 | 0 | 0 | 0 |
| | | NPA10 | 0 | 0 | 0 | 0 | 0 | 0 | 0 | 3.0 | 0 | 0 |
| | | NPA11 | 0 | 0 | 0 | 0 | 0 | 0 | 0 | 0 | 3.0 | 0 |
| | | NPA12 | 0 | 0 | 0 | 0 | 0 | 0 | 0 | 0 | 0 | 3.0 |
| | POLYMERIZABLE ADDITIVE | MA1 | 0 | 0 | 0 | 0 | 0 | 0 | 0 | 0 | 0 | 0 |
| | | MA2 | 0 | 0 | 0 | 0 | 0 | 0 | 0 | 0 | 0 | 0 |
| | | MA3 | 0 | 0 | 0 | 0 | 0 | 0 | 0 | 0 | 0 | 0 |
| | INITIATOR | PI1 | 1.0 | 1.0 | 1.0 | 1.0 | 1.0 | 1.0 | 1.0 | 1.0 | 1.0 | 1.0 |
| | SPACER | | 1.0 | 1.0 | 1.0 | 1.0 | 1.0 | 1.0 | 1.0 | 1.0 | 1.0 | 1.0 |
| HAZE (%) | NO VOLTAGE APPLIED | -20° C | 97 | 97 | 97 | 97 | 97 | 97 | 97 | 97 | 97 | 97 |
| | | -10° C | 97 | 97 | 97 | 97 | 97 | 97 | 97 | 97 | 97 | 97 |
| | | 0° C | 97 | 97 | 97 | 97 | 97 | 97 | 97 | 97 | 97 | 97 |
| | | 23° C | 97 | 97 | 97 | 97 | 97 | 97 | 97 | 97 | 97 | 97 |
| | | 90° C | 91 | 89 | 90 | 90 | 87 | 89 | 88 | 91 | 87 | 92 |
| | | 100° C | 88 | 89 | 88 | 89 | 83 | 84 | 84 | 89 | 83 | 88 |
| | | DIFFERENCE(BETWEEN 23° C and 90° C) | 6 | 8 | 7 | 7 | 10 | 8 | 9 | 6 | 10 | 5 |
| | VOLTAGE APPLIED | -20° C | 4.5 | 4.7 | 4.6 | 5.3 | 4.5 | 4.6 | 5.0 | 5.1 | 5.0 | 5.0 |
| | | -10° C | 4.3 | 4.2 | 4.1 | 4.9 | 4.1 | 4.1 | 4.7 | 4.6 | 4.6 | 4.6 |
| | | 0° C | 4.1 | 4.1 | 4.0 | 4.0 | 4.0 | 4.0 | 4.0 | 4.0 | 4.0 | 4.0 |
| | | 23° C | 4.2 | 4.1 | 4.2 | 4.2 | 4.1 | 4.1 | 4.2 | 4.2 | 4.2 | 4.2 |
| | | 90° C | 4.0 | 4.0 | 4.1 | 4.1 | 4.0 | 4.0 | 4.1 | 4.1 | 4.1 | 4.1 |
| | | 100° C | 4.0 | 3.9 | 4.0 | 3.9 | 3.9 | 4.0 | 3.9 | 3.9 | 3.9 | 3.9 |
| RESPONSE TIME (SEC) | ON OPERATION | -20° C | 1 | 1 | 1 | 1 | 1 | 1 | 1 | 1 | 1 | 1 |
| | | -10° C | 1 | 1 | 1 | 1 | 1 | 1 | 1 | 1 | 1 | 1 |
| | | 23° C | 1 | 1 | 1 | 1 | 1 | 1 | 1 | 1 | 1 | 1 |
| | OFF OPERATION | -20° C | 1 | 1 | 1 | 1 | 1 | 1 | 1 | 2 | 1 | 1 |
| | | -10° C | 2 | 2 | 2 | 2 | 2 | 2 | 2 | 5 | 2 | 2 |
| | | 23° C | 1 | 1 | 1 | 1 | 1 | 1 | 1 | 1 | 1 | 1 |
| | | DIFFERENCE(BETWEEN -20° C and 23° C) | 0 | 0 | 0 | 0 | 0 | 0 | 0 | 1 | 0 | 0 |

FIG.6

| | | | EXAMPLE | | | | | | | | | | |
|---|---|---|---|---|---|---|---|---|---|---|---|---|---|
| | | | 31 | 32 | 33 | 34 | 35 | 36 | 37 | 38 | 39 | 40 | 41 |
| FORMULATION RATIO (wt%) | LIQUID CRYSTAL | LCM | 50.0 | 50.0 | 50.0 | 50.0 | 50.0 | 50.0 | 50.0 | 50.0 | 50.0 | 50.0 | 50.0 |
| | POLYMERIZABLE UNSATURATED COMPOUND | M1 | 27.0 | 27.0 | 27.0 | 27.0 | 27.0 | 27.0 | 27.0 | 27.0 | 27.0 | 28.9 | 28.9 |
| | | M2 | 6.0 | 6.0 | 6.0 | 6.0 | 6.0 | 6.0 | 6.0 | 6.0 | 6.0 | 6.0 | 6.0 |
| | | M3 | 11.0 | 11.0 | 11.0 | 11.0 | 11.0 | 11.0 | 11.0 | 11.0 | 11.0 | 12.9 | 12.9 |
| | NON-POLYMERIZABLE ADDITIVE | NPA1 | 4.0 | 0 | 0 | 0 | 0 | 0 | 0 | 0 | 0 | 0 | 0 |
| | | NPA2 | 0 | 4.0 | 0 | 0 | 0 | 0 | 0 | 0 | 0 | 0 | 0 |
| | | NPA3 | 0 | 0 | 4.0 | 0 | 0 | 0 | 5.0 | 0 | 0 | 0 | 0 |
| | | NPA4 | 0 | 0 | 0 | 4.0 | 0 | 0 | 0 | 0 | 0 | 0.3 | 0 |
| | | NPA5 | 0 | 0 | 0 | 0 | 4.0 | 0 | 0 | 5.0 | 0 | 0 | 0 |
| | | NPA6 | 0 | 0 | 0 | 0 | 0 | 4.0 | 0 | 0 | 5.0 | 0 | 0.3 |
| | | NPA7 | 0 | 0 | 0 | 0 | 0 | 0 | 0 | 0 | 0 | 0 | 0 |
| | | NPA8 | 0 | 0 | 0 | 0 | 0 | 0 | 0 | 0 | 0 | 0 | 0 |
| | | NPA9 | 0 | 0 | 0 | 0 | 0 | 0 | 0 | 0 | 0 | 0 | 0 |
| | | NPA10 | 0 | 0 | 0 | 0 | 0 | 0 | 0 | 0 | 0 | 0 | 0 |
| | | NPA11 | 0 | 0 | 0 | 0 | 0 | 0 | 0 | 0 | 0 | 0 | 0 |
| | | NPA12 | 0 | 0 | 0 | 0 | 0 | 0 | 0 | 0 | 0 | 0 | 0 |
| | POLYMERIZABLE ADDITIVE | MA1 | 0 | 0 | 0 | 0 | 0 | 0 | 0 | 0 | 0 | 0 | 0 |
| | | MA2 | 0 | 0 | 0 | 0 | 0 | 0 | 0 | 0 | 0 | 0 | 0 |
| | | MA3 | 0 | 0 | 0 | 0 | 0 | 0 | 0 | 0 | 0 | 0 | 0 |
| | INITIATOR | PI1 | 1.0 | 1.0 | 1.0 | 1.0 | 1.0 | 1.0 | 1.0 | 1.0 | 1.0 | 1.0 | 1.0 |
| | SPACER | | 1.0 | 1.0 | 1.0 | 1.0 | 1.0 | 1.0 | 1.0 | 1.0 | 1.0 | 1.0 | 1.0 |
| HAZE (%) | NO VOLTAGE APPLIED | -20° C | 97 | 97 | 97 | 97 | 97 | 97 | 97 | 97 | 97 | 97 | 97 |
| | | -10° C | 97 | 97 | 97 | 97 | 97 | 97 | 97 | 97 | 97 | 97 | 97 |
| | | 0° C | 97 | 97 | 97 | 97 | 97 | 97 | 97 | 97 | 97 | 97 | 97 |
| | | 23° C | 97 | 97 | 97 | 97 | 97 | 97 | 97 | 97 | 97 | 97 | 97 |
| | | 90° C | 89 | 88 | 87 | 89 | 90 | 89 | 85 | 84 | 83 | 96 | 96 |
| | | 100° C | 85 | 85 | 86 | 85 | 85 | 85 | 83 | 81 | 80 | 95 | 95 |
| | | DIFFERENCE (BETWEEN 23° C and 90° C) | 8 | 9 | 10 | 8 | 7 | 8 | 12 | 13 | 14 | 1 | 1 |
| | VOLTAGE APPLIED | -20° C | 4.2 | 4.3 | 4.2 | 4.4 | 4.5 | 4.8 | 4.0 | 4.0 | 4.4 | 7.0 | 7.8 |
| | | -10° C | 4.1 | 4.0 | 3.9 | 4.1 | 4.0 | 4.6 | 3.9 | 3.9 | 4.2 | 5.7 | 6.3 |
| | | 0° C | 3.7 | 3.6 | 3.6 | 3.7 | 3.8 | 3.8 | 3.6 | 3.8 | 3.7 | 4.8 | 4.7 |
| | | 23° C | 3.8 | 3.7 | 3.5 | 3.5 | 3.5 | 3.6 | 3.5 | 3.5 | 3.6 | 4.7 | 4.6 |
| | | 90° C | 3.7 | 3.5 | 3.8 | 3.6 | 3.6 | 3.7 | 3.4 | 3.5 | 3.4 | 4.9 | 4.5 |
| | | 100° C | 3.6 | 3.7 | 3.6 | 3.5 | 3.7 | 3.6 | 3.5 | 3.4 | 3.4 | 4.8 | 4.7 |
| RESPONSE TIME (SEC) | ON OPERATION | -20° C | 1 | 1 | 1 | 1 | 1 | 1 | 1 | 1 | 1 | 1 | 1 |
| | | -10° C | 1 | 1 | 1 | 1 | 1 | 1 | 1 | 1 | 1 | 1 | 1 |
| | | 23° C | 1 | 1 | 1 | 1 | 1 | 1 | 1 | 1 | 1 | 1 | 1 |
| | OFF OPERATION | -20° C | 1 | 1 | 1 | 1 | 1 | 1 | 1 | 1 | 1 | 4 | 5 |
| | | -10° C | 1 | 1 | 1 | 1 | 1 | 1 | 1 | 1 | 1 | 8 | 9 |
| | | 23° C | 1 | 1 | 1 | 1 | 1 | 1 | 1 | 1 | 1 | 1 | 1 |
| | | DIFFERENCE (BETWEEN -20° C and 23° C) | 0 | 0 | 0 | 0 | 0 | 0 | 0 | 0 | 0 | 3 | 4 |

FIG.7

| | | | COMPARATIVE EXAMPLE | | | | | | |
|---|---|---|---|---|---|---|---|---|---|
| | | | 1 | 2 | 3 | 4 | 5 | 6 | 7 |
| FORMULATION RATIO (wt%) | LIQUID CRYSTAL | LCM | 50.0 | 50.0 | 50.0 | 50.0 | 50.0 | 50.0 | 50.0 |
| | POLYMERIZABLE UNSATURATED COMPOUND | M1 | 28.6 | 28.8 | 27.0 | 28.8 | 27.0 | 28.8 | 27.0 |
| | | M2 | 6.0 | 6.0 | 6.0 | 6.0 | 6.0 | 6.0 | 6.0 |
| | | M3 | 12.6 | 12.8 | 11.0 | 12.8 | 11.0 | 12.8 | 11.0 |
| | NON-POLYMERIZABLE ADDITIVE | NPA1 | 0 | 0 | 0 | 0 | 0 | 0 | 0 |
| | | NPA2 | 0 | 0 | 0 | 0 | 0 | 0 | 0 |
| | | NPA3 | 0 | 0 | 0 | 0 | 0 | 0 | 0 |
| | | NPA4 | 0 | 0 | 0 | 0 | 0 | 0 | 0 |
| | | NPA5 | 0 | 0 | 0 | 0 | 0 | 0 | 0 |
| | | NPA6 | 0 | 0 | 0 | 0 | 0 | 0 | 0 |
| | | NPA7 | 0 | 0 | 0 | 0 | 0 | 0 | 0 |
| | | NPA8 | 0 | 0 | 0 | 0 | 0 | 0 | 0 |
| | | NPA9 | 0 | 0 | 0 | 0 | 0 | 0 | 0 |
| | | NPA10 | 0 | 0 | 0 | 0 | 0 | 0 | 0 |
| | | NPA11 | 0 | 0 | 0 | 0 | 0 | 0 | 0 |
| | | NPA12 | 0 | 0 | 0 | 0 | 0 | 0 | 0 |
| | POLYMERIZABLE ADDITIVE | MA1 | 0 | 0.5 | 4.0 | 0 | 0 | 0 | 0 |
| | | MA2 | 0 | 0 | 0 | 0.5 | 4.0 | 0 | 0 |
| | | MA3 | 0 | 0 | 0 | 0 | 0 | 0.5 | 4.0 |
| | INITIATOR | PI1 | 1.0 | 1.0 | 1.0 | 1.0 | 1.0 | 1.0 | 1.0 |
| | SPACER | | 1.0 | 1.0 | 1.0 | 1.0 | 1.0 | 1.0 | 1.0 |
| HAZE (%) | NO VOLTAGE APPLIED | -20° C | 97 | 97 | 97 | 97 | 97 | 97 | 97 |
| | | -10° C | 97 | 97 | 97 | 97 | 97 | 97 | 97 |
| | | 0° C | 97 | 97 | 97 | 97 | 97 | 97 | 97 |
| | | 23° C | 97 | 97 | 97 | 97 | 97 | 97 | 97 |
| | | 90° C | 96 | 96 | 96 | 96 | 96 | 96 | 95 |
| | | 100° C | 94 | 94 | 94 | 93 | 94 | 94 | 93 |
| | | DIFFERENCE (BETWEEN 23° C and 90° C) | 1 | 1 | 1 | 1 | 1 | 1 | 2 |
| | VOLTAGE APPLIED | -20° C | 8.0 | 8.2 | 9.3 | 10.0 | 15.0 | 13.0 | 97.0 |
| | | -10° C | * | 6.8 | 7.6 | 8.6 | 12.0 | 10.0 | 97.0 |
| | | 0° C | * | 5.8 | 6.7 | 6.5 | 8.8 | 5.8 | 80.0 |
| | | 23° C | 5.2 | 5.3 | 5.7 | 5.4 | 5.7 | 5.3 | 60.0 |
| | | 90° C | 5.2 | 5.3 | 5.5 | 5.5 | 5.9 | 5.3 | 58.0 |
| | | 100° C | 5.1 | 5.2 | 5.4 | 5.4 | 5.8 | 5.2 | 57.0 |
| RESPONSE TIME (SEC) | ON OPERATION | -20° C | 1 | 1 | 1 | 1 | 1 | 1 | - |
| | | -10° C | 1 | 1 | 1 | 1 | 1 | 1 | * |
| | | 23° C | 1 | 1 | 1 | 1 | 1 | 1 | 1 |
| | OFF OPERATION | -20° C | 7 | 6 | 8 | 10 | 15 | 20 | - |
| | | -10° C | 12 | 12 | 14 | 15 | 25 | 30 | * |
| | | 23° C | 1 | 1 | 1 | 1 | 1 | 1 | 1 |
| | | DIFFERENCE (BETWEEN -20° C and 23° C) | 6 | 5 | 7 | 9 | 14 | 19 | - |

LIGHT CONTROL SHEET, METHOD FOR PRODUCING LIGHT CONTROL SHEET, AND LIQUID CRYSTAL COMPOSITION FOR POLYMER DISPERSION

CROSS-REFERENCE TO RELATED APPLICATIONS

The present application is a continuation of and claims the benefit of priority to International Application No. PCT/JP2022/013928, filed Mar. 24, 2022, which is based upon and claims the benefit of priority to Japanese Application No. 2021-049982, filed Mar. 24, 2021. The entire contents of these applications are incorporated herein by reference.

BACKGROUND OF THE INVENTION

Field of the Invention

The present invention relates to a light control sheet including a non-polymerizable liquid crystal compound, a method for producing the light control sheet, and a liquid crystal composition for polymer dispersion.

Description of Background Art

For example, JP 2018-45135 A describes a light control sheet. The entire contents of this publication are incorporated herein by reference.

SUMMARY OF THE INVENTION

According to one aspect of the present invention, a light control sheet includes an organic polymer layer partitioning voids, and a liquid crystal composition including a non-polymerizable liquid crystal compound and filling the voids. The light control sheet changes transmittance to visible light by driving the non-polymerizable liquid crystal compound, and the liquid crystal composition includes a non-polymerizable viscosity-reducing agent of formula (1), formula (1)

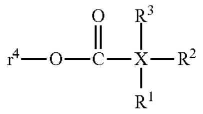

where X is a linear or branched alkyl group having 1 or more and 6 or fewer carbon atoms or an aryl group, each of $R^1$, $R^2$, and $R^3$ is independently a hydrogen atom or a functional group of formula (2), formula (2)

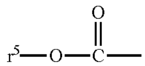

where $r^5$ is a linear or branched alkyl group having 1 or more and 10 or fewer carbon atoms or an ether group, and $r^4$ is a linear or branched alkyl group having 1 or more and 10 or fewer carbon atoms or an ether group.

According to another aspect of the present invention, a light control sheet includes an organic polymer layer partitioning voids, and a liquid crystal composition including a non-polymerizable liquid crystal compound and filling the voids. The light control sheet changes transmittance to visible light by driving the non-polymerizable liquid crystal compound, and the liquid crystal composition includes a non-polymerizable viscosity-reducing agent of formula (3), formula (3)

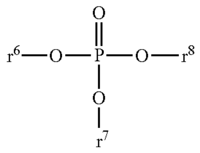

where each of $r^6$, $r^7$, and $r^8$ is independently a linear alkyl group having 3 or more and 8 or fewer carbon atoms.

According to yet another aspect of the present invention, a method for producing a light control sheet includes phase-separating liquid crystal particles including a liquid crystal composition including a non-polymerizable liquid crystal compound from an organic polymer layer by polymerizing a UV-curable compound in a layer including the liquid crystal composition and the UV-curable compound such that the organic polymer layer partitions voids and the liquid crystal composition fills the voids. The liquid crystal composition includes a non-polymerizable viscosity-reducing agent of formula (1), formula (1)

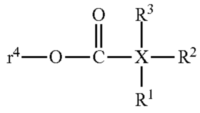

where X is a linear or branched alkyl group having 1 or more and 6 or fewer carbon atoms or an aryl group, each of $R^1$, $R^2$, and $R^3$ is independently a hydrogen atom or a functional group of formula (2), formula (2)

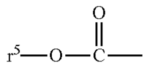

where $r^5$ is a linear or branched alkyl group having 1 or more and 10 or fewer carbon atoms or an ether group, and $r^4$ is a linear or branched alkyl group having 1 or more and 10 or fewer carbon atoms or an ether group, a ratio of a weight of the organic polymer layer to a total weight of the organic polymer layer and the liquid crystal composition is in a range of 30 mass % to 60 mass % or less, a ratio of a weight of the non-polymerizable viscosity-reducing agent to a weight of the non-polymerizable liquid crystal compound is in a range of 1% to 8%, and the light control sheet changes transmittance to visible light by driving the non-polymerizable liquid crystal compound.

According to yet another aspect of the present invention, a method for producing a light control sheet includes phase-separating liquid crystal particles including a liquid crystal composition including a non-polymerizable liquid crystal compound from an organic polymer layer by polymerizing a UV-curable compound in a layer including the liquid crystal composition and the UV-curable compound such that the organic polymer layer partitions voids and the liquid crystal composition fills the voids. The liquid crystal composition includes a non-polymerizable viscosity-reducing agent of formula (3), formula (3)

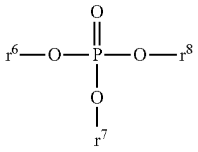

where each of $r^6$, $r^7$, and $r^8$ is independently a linear alkyl group having 3 or more and 8 or fewer carbon atoms, a ratio of a weight of the organic polymer layer to a total weight of the organic polymer layer and the liquid crystal composition is in a range of 30 mass % to 60 mass %, a ratio of a weight of the non-polymerizable viscosity-reducing agent to a weight of the non-polymerizable liquid crystal compound is in a range of 1% to 8%, and the light control sheet changes transmittance to visible light by driving the non-polymerizable liquid crystal compound.

According to yet another aspect of the present invention, a liquid crystal composition for polymer dispersion includes a UV-curable compound, a non-polymerizable liquid crystal compound, and a non-polymerizable viscosity-reducing agent of formula (1), formula (1)

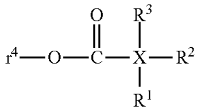

where X is a linear or branched alkyl group having 1 or more and 6 or fewer carbon atoms or an aryl group, each of $R^1$, $R^2$, and $R^3$ is independently a hydrogen atom or a functional group of formula (2), formula (2)

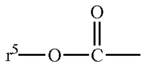

where $r^5$ is a linear or branched alkyl group having 1 or more and 10 or fewer carbon atoms or an ether group, and $r^4$ is a linear or branched alkyl group having 1 or more and 10 or fewer carbon atoms or an ether group, a ratio of a weight of the UV-curable compound to a total weight of the UV-curable compound and the liquid crystal composition is in a range of 30 mass % to 60 mass %, a ratio of a weight of the non-polymerizable viscosity-reducing agent to a weight of the non-polymerizable liquid crystal compound is in a range of 1% to 8%, and the liquid crystal composition is phase-separated from an organic polymer layer by polymerizing the UV-curable compound in a layer including the liquid crystal composition and the UV-curable compound.

According to still another aspect of the present invention, a liquid crystal composition for polymer dispersion includes a UV-curable compound, a non-polymerizable liquid crystal compound, and a non-polymerizable viscosity-reducing agent of formula (3), formula (3)

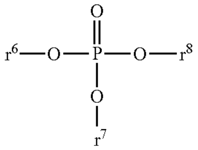

where each of $r^6$, $r^7$, and $r^8$ is independently a linear alkyl group having 3 or more and 8 or fewer carbon atoms, a ratio of a weight of the UV-curable compound to a total weight of the UV-curable compound and the liquid crystal composition is in a range of 30 mass % to 60 mass %, a ratio of a weight of the non-polymerizable viscosity-reducing agent to a weight of the non-polymerizable liquid crystal compound is in a range of 1% to 8%, and the liquid crystal composition is phase-separated from an organic polymer layer by polymerizing the UV-curable compound in a layer including the liquid crystal composition and the UV-curable compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table showing the compositions of the liquid crystal compositions for polymer dispersion of the examples and the evaluation results;

FIG. 4 is a table showing the compositions of the liquid crystal compositions for polymer dispersion of the examples and the evaluation results;

FIG. 5 is a table showing the compositions of the liquid crystal compositions for polymer dispersion of the examples and the evaluation results;

FIG. 6 is a table showing the compositions of the liquid crystal compositions for polymer dispersion of the examples and the evaluation results; and FIG. 7 is a table showing the compositions of the liquid crystal compositions for polymer dispersion of the comparative examples and the evaluation results.

DETAILED DESCRIPTION OF THE EMBODIMENTS

Figure 1:
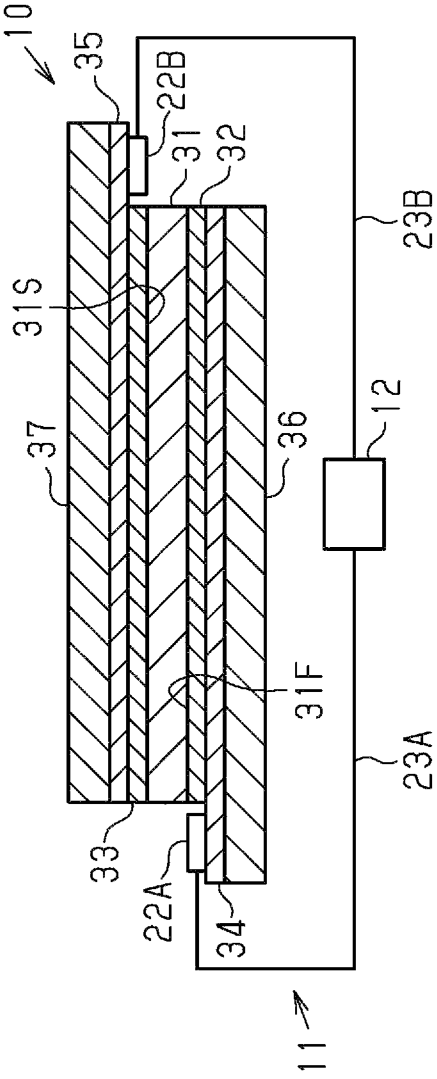
FIG. 1 illustrates an outline configuration of a light control device according to an embodiment of the present invention.

Embodiments will now be described with reference to the accompanying drawings, wherein like reference numerals designate corresponding or identical elements throughout the various drawings.

An embodiment of a light control sheet, a liquid crystal composition for polymer dispersion, and a method for producing the light control sheet will be described. First, referring to FIG. 1, a configuration of a light control device will be described. Next, referring to FIG. 2, configurations of the light control sheet and the liquid crystal composition for polymer dispersion will be described. Finally, the method for producing the light control sheet and examples of the light control sheet will be described.

The light control sheet is attached to a transparent substrate. The transparent substrate is a glass body or a resin body. Examples of the transparent substrate include window glass mounted on mobile objects such as vehicles and aircraft, window glass installed in buildings, and partitions placed inside the car or indoors. The surface to which the light control sheet is attached may be flat or curved. The light control sheet may be sandwiched between two transparent substrates.

The drive type of the light control sheet is a normal type or a reverse type. A normal-type light control sheet transitions from an opaque state to a transparent state by voltage application and returns from the transparent state to the opaque state by stopping the voltage application. A reverse-type light control sheet transitions from a transparent state to an opaque state by voltage application and returns from the opaque state to the transparent state by stopping the voltage application.

The normal type and the reverse type are common in that they have two transparent electrode layers and light control layers. The configuration and operation mainly of the reverse type will be described below, a configuration of the normal type that is different from the reverse type will be added, and a configuration of the normal type that overlaps with the reverse type will be omitted.

Light Control Device

As shown in FIG. 1, the light control device 10 has a light control sheet 11 and a driving unit 12. The light control sheet 11 has a light control layer 31, a first orientation layer 32, a second orientation layer 33, a first transparent electrode layer 34, a second transparent electrode layer 35, a first transparent support layer 36, and a second transparent support layer 37.

The light control layer 31 is located between the first orientation layer 32 and the second orientation layer 33. A first surface 31F of the light control layer 31 is in contact with the first orientation layer 32, and a second surface 31S of the light control layer 31 is in contact with the second orientation layer 33. The first orientation layer 32 is located between the light control layer 31 and the first transparent electrode layer 34 and is in contact with the light control layer 31 and the first transparent electrode layer 34. The second orientation layer 33 is located between the light control layer 31 and the second transparent electrode layer 35 and is in contact with the light control layer 31 and the second transparent electrode layer 35.

The first transparent electrode layer 34 is connected to the driving unit 12 through a first connection terminal 22A and a first wiring 23A. The first transparent electrode layer 34 is located between the first orientation layer 32 and the first transparent support layer 36 and is in contact with the first orientation layer 32 and the first transparent support layer 36. The second transparent electrode layer 35 is connected to the driving unit 12 through a second connection terminal 22B and a second wiring 23B. The second transparent electrode layer 35 is located between the second orientation layer 33 and the second transparent support layer 37 and is in contact with the second orientation layer 33 and the second transparent support layer 37.

Figure 2:
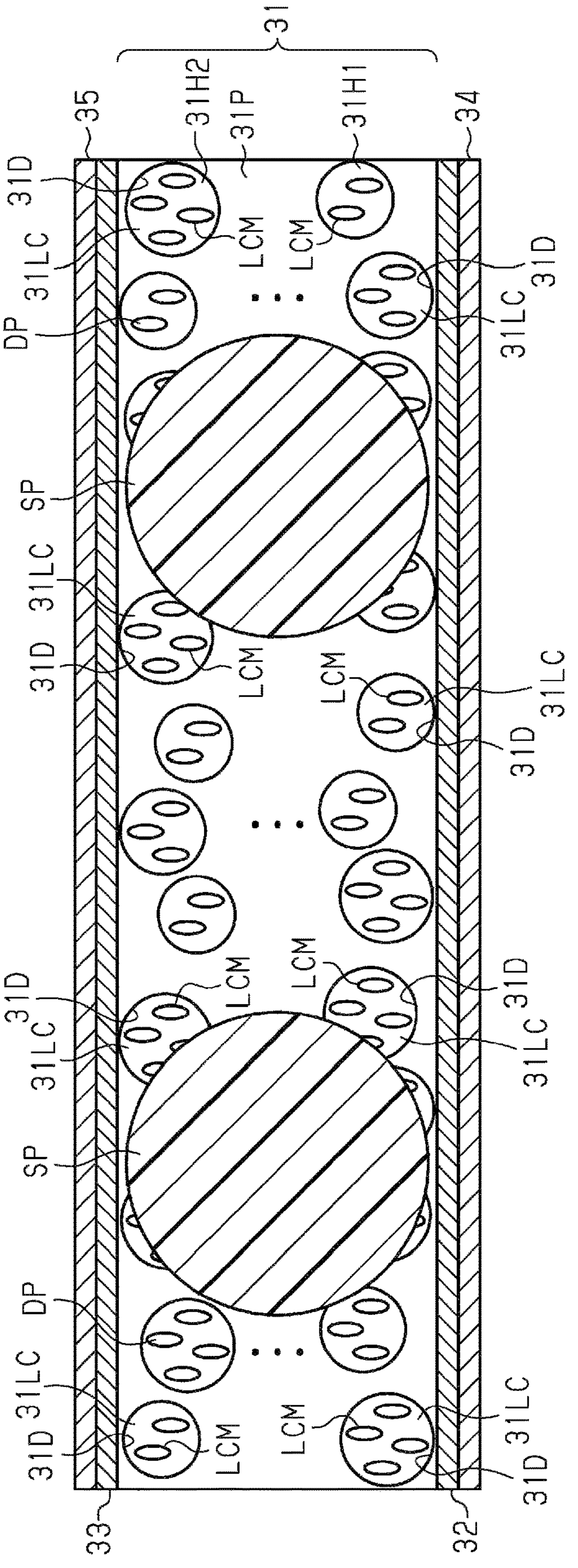
FIG. 2 illustrates a cross-sectional configuration of a light control sheet according to an embodiment of the present invention.

The light control layer 31 includes an organic polymer layer 31P (see FIG. 2) and a liquid crystal composition 31LC (see FIG. 2). The organic polymer layer 31P partitions voids 31D buried in the liquid crystal composition 31LC. The type in which the liquid crystal composition 31LC is held by the organic polymer layer 31P is one selected from a group of a polymer dispersion type, a polymer network type, and a capsule type.

A polymer dispersion-type light control layer 31 includes an organic polymer layer 31P that partitions a number of isolated voids 31D and holds a liquid crystal composition 31LC inside the voids 31D dispersed in the organic polymer layer 31P. A polymer network-type light control layer 31 has three-dimensional mesh-like voids 31D in an organic polymer layer 31P and holds a liquid crystal composition 31LC inside the interconnected mesh-like voids 31D. A capsule-type light control layer 31 holds a liquid crystal composition 31LC inside capsule-like voids 31D dispersed in an organic polymer layer 31P.

The first orientation layer 32 and the second orientation layer 33 each regulate the orientation direction of a non-polymerizable liquid crystal compound LCM. The first orientation layer 32 and the second orientation layer 33 each appear colorless and transparent, or colored and transparent. The first orientation layer 32 and the second orientation layer 33 are vertical orientation films. Vertical orientation films align the major axis direction of the non-polymerizable liquid crystal compound LCM along the thickness direction of the light control layer 31 and allow visible light to pass through the light control layer 31.

The material constituting the first orientation layer 32 and second orientation layer 33 is an organic polymer compound or an inorganic oxide. The organic polymer compound is one selected from a group of polyimide, polyamide, polyvinyl alcohol, and nitriles. The inorganic oxide is one selected from a group of silicon oxide, zirconium oxide, and silicone.

The first transparent electrode layer 34 and second transparent electrode layer 35 each appear colorless and transparent, or colored and transparent. The materials constituting the first transparent electrode layer 34 and second transparent electrode layer 35 are each a conductive inorganic oxide, metal, or a conductive organic polymer compound. An example of the conductive inorganic oxide is one selected from a group of indium tin oxide, fluorine-doped tin oxide, tin oxide, and zinc oxide. The metal is a gold or silver nanowire. An example of the conductive organic polymer compound is one selected from a group of carbon nanotubes and poly(3,4-ethylenedioxythiophene).

The first transparent support layer 36 and second transparent support layer 37 each appear colorless and transparent, or colored and transparent. The materials constituting the first transparent support layer 36 and second transparent support layer 37 are each an organic polymer compound or an inorganic polymer compound. An example of the organic polymer compound is one selected from a group of polyester, polyacrylate, polycarbonate, and polyolefin. An example of the inorganic polymer compound is one selected from a group of silicon oxide, silicon oxynitride, and silicon nitride.

The driving unit 12 is separately connected to the first transparent electrode layer 34 and the second transparent electrode layer 35. The driving unit 12 applies a drive voltage between the first transparent electrode layer 34 and the second transparent electrode layer 35. The drive voltage is the voltage for changing the orientation state of the non-polymerizable liquid crystal compound LCM. The driving unit 12 changes the orientation state of the non-polymerizable liquid crystal compound LCM to switch the light control sheet 11 from one of the transparent state and the opaque state to the other. The opaque state has lower parallel transmittance than the transparent state and higher haze than the transparent state.

When the application of the drive voltage is stopped, the non-polymerizable liquid crystal compound LCM receives orientation regulation force from the first orientation layer 32 and the second orientation layer 33, and the major axis direction of the non-polymerizable liquid crystal compound LCM is along the thickness direction of the light control layer 31. As a result, the light control sheet 11 becomes a transparent state while scattering in the light control layer 31 is suppressed over the entire visible light region.

When the drive voltage starts to be applied, the non-polymerizable liquid crystal compound LCM receives the orientation regulation force of the electric field, and the major axis direction of the non-polymerizable liquid crystal compound LCM starts to move in the direction perpendicular to the direction of the electric field. In this case, the major axis direction of the non-polymerizable liquid crystal compound LCM is constrained by intermolecular interactions in the liquid crystal composition 31LC and the size of the voids 31D, cannot move sufficiently, and becomes disordered. As a result, the light control sheet 11 becomes an opaque state while scattering in the light control layer 31 occurs over the entire visible light region.

When the application of the drive voltage is stopped again, the non-polymerizable liquid crystal compound LCM is released from the orientation regulation force of the electric field, and according to the orientation regulation force of the first orientation layer 32 and second orientation layer 33, the major axis direction of the non-polymerizable liquid crystal compound LCM is aligned along the thickness direction of the light control layer 31. As a result, the light control sheet 11 becomes a transparent state again while scattering in the light control layer 31 is suppressed over the entire visible light region.

The light control sheet 11 may not have the first orientation layer 32 and the second orientation layer 33 as long as the light control sheet 11 is switched between the transparent and opaque states based on changes in the orientation state of the non-polymerizable liquid crystal compound LCM by voltage application. In this case, the first surface 31F of the light control layer 31 is in contact with the first transparent electrode layer 34, and the second surface 31S of the light control layer 31 is in contact with the second transparent electrode layer 35. That is, the drive type of the light control sheet 11 may be changed from the reverse type to the normal type.

In the case where the first orientation layer 32 and the second orientation layer 33 are omitted, when the application of the drive voltage is stopped, the non-polymerizable liquid crystal compound LCM does not receive the orientation regulation force, and the major axis direction of the non-polymerizable liquid crystal compound LCM becomes disordered. As a result, the light control sheet 11 becomes an opaque state while scattering in the light control layer 31 occurs over the entire visible light region.

When the drive voltage is applied, the non-polymerizable liquid crystal compound LCM receives the orientation regulation force of the electric field, and the major axis direction of the non-polymerizable liquid crystal compound LCM becomes aligned along the direction of the electric field. As a result, the light control sheet 11 becomes a transparent state while scattering in the light control layer 31 is suppressed over the entire visible light region.

When the application of the drive voltage is stopped again, the non-polymerizable liquid crystal compound LCM is released from the orientation regulation force of the electric field, and the major axis direction of the non-polymerizable liquid crystal compound LCM becomes disordered. As a result, the light control sheet 11 becomes an opaque state again while scattering in the light control layer 31 occurs over the entire visible light region.

Light Control Sheet

As shown in FIG. 2, the light control layer 31 includes an organic polymer layer 31P, a liquid crystal composition 31LC, and spacers SP. The organic polymer layer 31P partitions voids 31D buried in the liquid crystal composition 31LC. The organic polymer layer 31P partitions multiple voids 31D. The voids 31D may be isolated from other adjacent voids 31D or connected to other adjacent voids 31D. The voids 31D have two or more sizes and include relatively large voids 31H1 and relatively small voids 31H2. The shape of the voids 31D is spherical, ellipsoidal, or irregular.

Photopolymerizable Compound

The organic polymer layer 31P is a cured photopolymerizable compound. The photopolymerizable compound may be a UV-curable compound or an electron beam-curable compound. The photopolymerizable compound is compatible with the liquid crystal composition 31LC. In order to improve the dimensional controllability of the voids 31D, the photopolymerizable compound is preferably a UV-curable compound. An example of the UV-curable compound contains polymerizable unsaturated bonds at the ends of the molecular structure. Alternatively, the UV-curable compound contains polymerizable unsaturated bonds at sites other than the ends of the molecular structure. The photopolymerizable compound is a single polymerizable compound or a combination of two or more polymerizable compounds.

The UV-curable compound is at least one member selected from a group of acrylate compounds, methacrylate compounds, styrene compounds, thiol compounds, and oligomers of these compounds.

The acrylate compounds include monoacrylate compounds, diacrylate compounds, triacrylate compounds, and tetraacrylate compounds. Examples of the acrylate compounds include butyl ethyl acrylate, ethyl hexyl acrylate, and cyclohexyl acrylate. Examples of the methacrylate compounds include dimethacrylate compounds, trimethacrylate compounds, and tetramethacrylate compounds. Examples of the methacrylate compounds include N,N-dimethylaminoethyl methacrylate, phenoxyethyl methacrylate, methoxyethyl methacrylate, and tetrahydrofurfuryl methacrylate. Examples of the thiol compounds include 1,3-propanedithiol and 1,6-hexanedithiol. Examples of the styrene compounds include styrene and methyl styrene.

The lower limit of the content of the organic polymer layer 31P relative to the total amount of the organic polymer layer 31P and the liquid crystal composition 31LC is 20 mass %, and more preferably 30 mass %. The upper limit of the content of the organic polymer layer 31P relative to the total amount of the organic polymer layer 31P and the liquid crystal composition 31LC is 70 mass %, and more preferably 60 mass %.

The lower and upper limits of the content of the organic polymer layer 31P are within the range in which liquid crystal particles made of the liquid crystal composition 31LC are phase-separated from the cured photopolymerizable compound in the curing process of the photopolymerizable compound. When it is necessary to increase the mechanical strength of the organic polymer layer 31P, the lower limit of the content of the organic polymer layer 31P is preferably high. When it is necessary to reduce the drive voltage of the non-polymerizable liquid crystal compound LCM, the upper limit of the content of the organic polymer layer 31P is preferably low.

Liquid Crystal Composition

The liquid crystal composition 31LC is a polymer dispersion type liquid crystal composition. The liquid crystal composition 31LC contains a non-polymerizable liquid crystal compound LCM and a non-polymerizable viscosity-reducing agent DP and is filled in the voids 31D. The liquid crystal composition 31LC may contain a dichroic dye, a defoaming agent, an antioxidant, a weathering agent, and a solvent. Examples of weathering agents include UV absorbers and light stabilizers.

Non-Polymerizable Liquid Crystal Compound

The permittivity of the non-polymerizable liquid crystal compound LCM in the major axis direction may have larger positive dielectric anisotropy than the permittivity of the non-polymerizable liquid crystal compound LCM in the minor axis direction. Alternatively, the permittivity of the non-polymerizable liquid crystal compound LCM in the major axis direction may have lower negative dielectric anisotropy than the permittivity of the non-polymerizable liquid crystal compound LCM in the minor axis direction. The dielectric anisotropy of the non-polymerizable liquid crystal compound LCM is suitably selected based on the presence or absence of each orientation layer in the light control sheet 11 and the drive type.

The non-polymerizable liquid crystal compound LCM is at least one member selected from a group of those based on Schiff bases, azo types, azoxy types, biphenyls, terphenyls, benzoic acid esters, tolan types, pyrimidines, pyridazines, cyclohexanecarboxylic acid esters, phenylcyclohexanes, biphenylcyclohexanes, dicyanobenzenes, naphthalenes, and dioxanes. The non-polymerizable liquid crystal compound LCM is a single liquid crystal compound or a combination of two or more liquid crystal compounds.

An example of the non-polymerizable liquid crystal compound LCM is represented by the following formula (10):

$$R^{11}-A^{11}-Z^{11}-A^{12}-Z^{12}-A^{13}-Z^{13}-A^{14}-R^{12} \quad (10)$$

$R^{11}$ is a hydrogen atom or an alkyl group having 1 or more and 20 or fewer carbon atoms. One methylene bond or two or more non-adjacent methylene bonds contained in the alkyl group of $R^{11}$ can be replaced by one selected from a group of oxygen atoms, ethylene bonds, ester bonds, and diether bonds.

$R^{12}$ is a hydrogen atom, a fluorine atom, a chlorine atom, a nitrile group, a trifluoromethyl group, a trifluoromethoxy group, a difluoromethoxy group, or an alkyl group having 1 or more and 15 or fewer carbon atoms. One methylene bond or two or more non-adjacent methylene bonds contained in the alkyl group of $R^{12}$ can be replaced by one selected from a group of oxygen atoms, ethylene bonds, ester bonds, and diether bonds.

$A^{11}$, $A^{12}$, $A^{13}$, and $A^{14}$ each independently represent a 1,4-phenylene group or a 2,6-naphthylene group. One hydrogen atom or two or more hydrogen atoms of the 1,4-phenylene group or 2,6-naphthylene group can be replaced by a fluorine atom, a chlorine atom, a trifluoromethyl group, or a trifluoromethoxy group. $A^{11}$, $A^{12}$, $A^{13}$, and $A^{14}$ may be each independently a 1,4-cyclohexylene group, a 3,6-cyclohexenylene group, a 1,3-dioxane-2,5-diyl group, or a pyridine-2,5-diyl group. $A^{13}$ and $A^{14}$ may be each independently a single bond.

$Z^{11}$, $Z^{12}$, and $Z^{13}$ each independently represent one member selected from a group of single bonds, ester bonds, diether bonds, ethylene bonds, fluoroethylene bonds, and carbonyl bonds.

The rate at which the orientation state of the non-polymerizable liquid crystal compound LCM changes with respect to the change in the potential difference changes nonlinearly with respect to the ambient temperature and becomes significantly slower as the ambient temperature is lower. It is particularly more difficult for the non-polymerizable liquid crystal compound LCM to change its major axis direction in the voids 31D partitioned by the organic polymer layer 31P, compared with a structure in which the liquid crystal composition 31LC is filled in a wide layered space, such as a liquid crystal panel used in a display device. The responsiveness of the non-polymerizable liquid crystal compound LCM is highly dependent on the interactions between the molecules of the non-polymerizable liquid crystal compound LCM.

The NI point of the non-polymerizable liquid crystal compound LCM is the temperature at which the non-polymerizable liquid crystal compound LCM transitions from the nematic phase (N phase) to the isotropic liquid phase (I phase). The NI point of the non-polymerizable liquid crystal compound LCM indicates the degree to which the anisotropy of the non-polymerizable liquid crystal compound LCM disappears at an ambient temperature. Further, the NI point of the non-polymerizable liquid crystal compound LCM reflects not a little the degree of intermolecular interactions in the non-polymerizable liquid crystal compound LCM.

When the non-polymerizable liquid crystal compound LCM is a combination of two or more liquid crystal compounds, the NI point of the non-polymerizable liquid crystal compound LCM is the weighted average value of the NI points of the respective liquid crystal compounds weighted by the formulation ratio of each liquid crystal compound. It is possible to increase or decrease the NI point of the non-polymerizable liquid crystal compound LCM by the composition of two or more liquid crystal compounds with mutually different NI points.

When it is necessary to enhance the orientational order of the non-polymerizable liquid crystal compound LCM at high ambient temperatures, such as 100° C., the NI point is preferably high, and more preferably 100° C. or more. When it is necessary to increase the homogenization of the non-polymerizable liquid crystal compound LCM and the photopolymerizable compound, the NI point is preferably low, and more preferably 145° C. or less.

The CN point of the non-polymerizable liquid crystal compound LCM is the temperature at which the non-polymerizable liquid crystal compound LCM transitions from the crystalline phase (C phase) to the nematic phase (N phase). The CN point of the non-polymerizable liquid crystal compound LCM indicates the degree to which the fluidity of the non-polymerizable liquid crystal compound LCM disappears at an ambient temperature. Further, the CN point of the non-polymerizable liquid crystal compound LCM largely reflects the degree of intermolecular interactions in the non-polymerizable liquid crystal compound LCM.

When the non-polymerizable liquid crystal compound LCM is a combination of two or more liquid crystal compounds, the CN point of the non-polymerizable liquid crystal compound LCM is the weighted average value of the CN points of the respective liquid crystal compounds weighted by the formulation ratio of each liquid crystal compound. It is possible to increase or decrease the CN point of the non-polymerizable liquid crystal compound LCM by the composition of two or more liquid crystal compounds with mutually different CN points.

When it is necessary to increase the fluidity of the non-polymerizable liquid crystal compound LCM at low ambient temperatures, such as −20° C., the CN point is preferably low, more preferably 25° C. or less, and even more preferably 0° C. or less.

The refractive index difference $\Delta n$ ($\Delta n$=extraordinary refractive index ne-ordinary refractive index no) between the major and minor axis directions of the non-polymerizable liquid crystal compound LCM indicates the degree of intermolecular interactions in the non-polymerizable liquid crystal compound LCM. Further, the refractive index difference $\Delta n$ of the non-polymerizable liquid crystal compound LCM is the difference in refractive index to visible light with a wavelength of 650 nm and indicates the difference in scattering of visible light between application and non-application of the drive voltage. When the non-polymerizable liquid crystal compound LCM is a combination of two or more liquid crystal compounds, the upper limit of the refractive index difference $\Delta n$ of the non-polymerizable liquid crystal compound LCM is obtained from the refractive index difference $\Delta n$ of all of the liquid crystal compounds. The lower limit of the refractive index difference $\Delta n$ of the non-polymerizable liquid crystal compound LCM is obtained from the refractive index difference $\Delta n$ of all of the liquid crystal compounds.

When it is necessary to enhance the orientation controllability of the non-polymerizable liquid crystal compound LCM at a high ambient temperature, the lower limit of the refractive index difference $\Delta n$ is preferably high. Further, when it is necessary to increase the difference in haze between the transparent and opaque states, the lower limit of the refractive index difference $\Delta n$ is preferably high. When it is necessary to enhance the orientation controllability of the non-polymerizable liquid crystal compound LCM at high ambient temperatures, such as 100° C., the lower limit of the refractive index difference $\Delta n$ of the non-polymerizable liquid crystal compound LCM is preferably 0.005, and more preferably 0.01. Alternatively, when it is necessary to increase the difference in haze, the lower limit of the refractive index difference $\Delta n$ of the non-polymerizable liquid crystal compound LCM is preferably 0.005, and more preferably 0.01.

When it is necessary to increase the responsiveness of the transmittance at a low ambient temperature, the lower limit of the refractive index difference $\Delta n$ is preferably low. When it is necessary to further increase the responsiveness of the transmittance at low ambient temperatures, such as −20° C., the upper limit of the refractive index difference $\Delta n$ of the non-polymerizable liquid crystal compound LCM is 0.028, and more preferably 0.02.

Non-Polymerizable Viscosity-Reducing Agent

The non-polymerizable viscosity-reducing agent DP contains a non-polar group, such as an alkyl group, for weakening the intermolecular interactions between the mutually adjacent non-polymerizable liquid crystal compounds LCM. The non-polymerizable viscosity-reducing agent DP contains a polar group, such as an ester bond, having polarity that interacts with the polarity of the non-polymerizable liquid crystal compound LCM.

The non-polymerizable viscosity-reducing agent DP is represented by the following formula (1) or (3). An example of the non-polymerizable viscosity-reducing agent DP represented by formula (1) is at least one member selected from a group of dibutyl adipate, bis(2-ethylhexyl) adipate, diisononyl adipate, diisodecyl adipate, bis(2-butoxyethyl) adipate, diethyl malonate, di-n-butyl phthalate, bis(2-ethylhexyl) phthalate, tris(2-ethylhexyl) trimellitate, tributyl o-acetylcitrate, and methyl benzoate. An example of the non-polymerizable viscosity-reducing agent DP represented by formula (3) is at least one member selected from a group of tripropyl phosphate, tributyl phosphate, and tripentyl phosphate. The non-polymerizable viscosity-reducing agent DP may be a single viscosity-reducing agent or a combination of two or more viscosity-reducing agents.

Chemical Formula 1 formula (1)

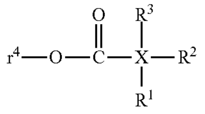

X in formula (1) is a linear or branched alkyl group having 1 or more and 6 or fewer carbon atoms or an aryl group. $R^1$, $R^2$, and $R^3$ in formula (1) are each independently a hydrogen atom or a functional group represented by formula (2). $r^4$ in formula (1) is a linear or branched alkyl group having 1 or more and 10 or fewer carbon atoms or an ether group.

Chemical Formula 2 formula (2)

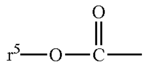

In formula (2), $r^5$ is a linear or branched alkyl group having 1 or more and 10 or fewer carbon atoms or an ether group.

Chemical Formula 3 formula (3)

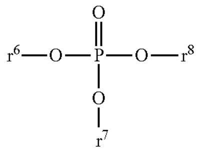

$r^6$, $r^7$, and $r^8$ in formula (3) are each independently a linear alkyl group having 3 or more and 6 or fewer carbon atoms or an ether group.

The lower limit of the content of the non-polymerizable viscosity-reducing agent DP relative to the total amount of the non-polymerizable liquid crystal compound LCM and the non-polymerizable viscosity-reducing agent DP is 0.6 mass %, more preferably 1 mass %, and even more preferably 2 mass %. The upper limit of the content of the non-polymerizable viscosity-reducing agent DP relative to the total amount of the non-polymerizable liquid crystal compound LCM and the non-polymerizable viscosity-reducing agent DP is 10 mass %, more preferably 8 mass %, and even more preferably 6 mass %.

When it is necessary to enhance the orientation controllability of the non-polymerizable liquid crystal compound LCM at a high ambient temperature, the upper limit of the content of the non-polymerizable viscosity-reducing agent DP is preferably low. When it is necessary to increase the responsiveness of the transmittance at a low ambient temperature, the upper limit of the content of the non-polymerizable liquid crystal compound LCM is preferably high.

The dichroic dye is driven by a guest-host type with the non-polymerizable liquid crystal compound LCM as the host to develop color. The dichroic dye is at least one member selected from a group of polyiodine, azo compounds, anthraquinone compounds, naphthoquinone compounds, azomethine compounds, tetrazine compounds, quinophthalone compounds, merocyanine compounds, perylene compounds, and dioxazine compounds. The dichroic dye is a single compound or a combination of two or more compounds.

When it is necessary to enhance light resistance and increase the dichroic ratio, the dichroic dye is at least one member selected from a group of azo compounds and anthraquinone compounds, and more preferably azo compounds.

Spacers SP are distributed throughout the entire organic polymer layer 31P. The spacers SP determine the thickness of the light control layer 31 around the spacers SP, and uniform the thickness of the light control layer 31. The spacers SP may be bead spacers, or photo-spacers formed by exposure and development of photoresist. The spacers SP may be colorless and transparent, or colored and transparent. When the liquid crystal composition 31LC contains a dichroic dye, the color developed by the spacers SP is preferably the same as the color developed by the dichroic dye.

The light control sheet 11 may have other functional layers as long as the light control sheet 11 is switched between the transparent and opaque states based on changes in the orientation state of the non-polymerizable liquid crystal compound LCM by voltage application. The other functional layer may be a gas barrier layer that suppresses the permeation of oxygen and moisture toward the light control layer 31, or an ultraviolet barrier layer that suppresses the transmission of ultraviolet rays of a wavelength other than the specific wavelength toward the light control layer 31. The other functional layer may be a hard coat layer that physically protects each layer of the light control sheet 11, or an adhesive layer that increases the adhesion between the layers in the light control sheet 11.

Method for Producing Light Control Sheet

A method for producing the light control sheet 11 includes forming a coating film containing the photopolymerizable compound and the liquid crystal composition 31LC between a first transparent support layer 36 and a second transparent support layer 37. The first transparent support layer 36 includes a first orientation layer 32 and a first transparent electrode layer 34. The second transparent support layer 37 includes a second orientation layer 33 and a second transparent electrode layer 35. In a method for producing a light control sheet 11 that does not have the first orientation layer 32 and the second orientation layer 33, a coating film containing the photopolymerizable compound and the liquid crystal composition 31LC is formed between the first transparent support layer 36 and the second transparent support layer 37. The first transparent support layer 36 does not have the first orientation layer 32 and includes a first transparent electrode layer 34. The second transparent support layer 37 does not have the second orientation layer 33 and includes a second transparent electrode layer 35.

The coating film contains a polymerization initiator for initiating the polymerization of the photopolymerizable compound. The polymerization initiator is at least one member selected from a group of diketone compounds, acetophenone compounds, benzoin compounds, benzophenone compounds, and thioxanthone compounds. The polymerization initiator may be a single compound or a combination of two or more compounds. An example of the polymerization initiator is one member selected from a group of benzoin methyl ether, benzoin ethyl ether, benzoin isopropyl ether, and cyclohexyl phenyl ketone.

The method for producing the light control sheet 11 includes polymerizing the photopolymerizable compound in the coating film, thereby phase-separating liquid crystal particles made of the liquid crystal composition 31LC from the polymer. The radiation for polymerizing the photopolymerizable compound may be ultraviolet rays or electron beams. The light applied to the coating film may be applied toward the first transparent support layer 36 or toward the second transparent support layer 37 or may be applied toward both of them.

The phase separation of the liquid crystal particles made of the liquid crystal composition 31LC proceeds through the polymerization of the photopolymerizable compound and the dispersion of the liquid crystal composition 31LC. The polymerization rate of the photopolymerizable compound depends on the intensity of the light applied to the photopolymerizable compound. The dispersion rate of the liquid crystal composition 31LC depends on the treatment temperature during polymerization of the photopolymerizable compound. In the phase separation of the liquid crystal composition 31LC, the intensity of the light applied to the photopolymerizable compound is set so that the liquid crystal particles have the desired size, that is, the voids 31D have the desired size. Further, in the phase separation of the liquid crystal composition 31LC, heating may be performed to promote the dispersion of the liquid crystal composition 31LC.

When it is necessary to reduce the size of the voids 31D, it is preferable to increase the intensity of the light applied to the photopolymerizable compound and advance the polymerization at a low temperature to suppress the dispersion of the liquid crystal composition 31LC. When it is necessary to increase the size of the voids 31D, it is preferable to decrease the intensity of the light applied to the photopolymerizable compound and advance the polymerization at a high temperature to promote the dispersion of the liquid crystal composition 31LC.

EXAMPLES

Specific examples and comparative examples of the light control sheet 11 are shown below. The examples and comparative examples are normal-type light control sheets 11 from which a first orientation layer 32 and a second orientation layer 33 are omitted. A coating film containing a photopolymerizable compound and a liquid crystal composition 31LC was formed between a first transparent support layer 36 including a first transparent electrode layer 34 and a second transparent support layer 37 including a second transparent electrode layer 35, and the photopolymerizable compound was polymerized in the coating film, thereby obtaining the light control sheet 11.

The constituent materials used in the examples and comparative examples are shown below. The NI point of the non-polymerizable liquid crystal compound LCM is 110° C. Further, FIGS. 3 to 7 show the formulation ratio of the constituent materials in Examples 1 to 41 and Comparative Examples 1 to 7. The formulation ratio shown in FIGS. 3 to 7 indicates the proportion of each constituent material to the total amount of the coating solution for forming the coating film.

First transparent electrode layer 34: indium tin oxide

Second transparent electrode layer 35: indium tin oxide

First transparent support layer 36: polyethylene terephthalate film

Second transparent support layer 37: polyethylene terephthalate film
Polymerization initiator PI1: 1-hydroxycyclohexyl phenyl ketone
Non-polymerizable liquid crystal compound LCM: cyanobiphenyl compound
Spacer SP: spherical shape with a diameter of 15 μm (made of PMMA)
UV-polymerizable compound (polymerizable unsaturated compound)
  Component M1: isobornyl acrylate
  Component M2: pentaerythritol triacrylate
  Component M3: urethane acrylate-non-polymerizable viscosity-reducing agent DP (non-polymerizable additive)
  Component NPA1: dibutyl adipate
  Component NPA2: dioctyl adipate
  Component NPA3: diisononyl adipate
  Component NPA4: diisodecyl adipate
  Component NPA5: bis(2-butoxyethyl) adipate
  Component NPA6: diethyl malonate
  Component NPA7: di-n-butyl phthalate
  Component NPA8: bis(2-ethylhexyl) phthalate
  Component NPA9: tris(2-ethylhexyl) trimellitate
  Component NPA10: tributyl o-acetyl citrate
  Component NPA11: methyl benzoate
  Component NPA12: tributyl phosphate
Polymerizable additives
  Component MA1: butyl acrylate
  Component MA2: triethylene glycol diacrylate
  Component MA3: pentaerythritol triacrylate Examples 1 to 6

As shown in FIG. 3, 0.5 mass % of any of the components NPA1 to NPA6 was used as the non-polymerizable viscosity-reducing agent DP in each of the coating solutions of Examples 1 to 6. Using each of the coating solutions of Examples 1 to 6, a coating film with a thickness of 20 μm was formed on the first transparent electrode layer 34, and spacers SP were dispersed in the coating film. Then, the coating film with the dispersed spacers SP was laminated with the first transparent electrode layer 34 and the second transparent electrode layer 35, and the resulting laminate was irradiated with UV light at 365 nm toward the first transparent support layer 36, thereby obtaining light control sheets 11 of Examples 1 to 6. In this case, the intensity of the UV light was set to 10 mW/cm$^2$, and the UV irradiation time was set to 100 seconds.

Examples 7 to 12

As shown in FIGS. 3 and 4, 1.0 mass % of any of the components NPA1 to NPA6 was used as the non-polymerizable viscosity-reducing agent DP in each of the coating solutions of Examples 7 to 12. Light control sheets 11 of Examples 7 to 12 were obtained in the same manner as in Example 1, except for the formulation ratio of the non-polymerizable viscosity-reducing agent DP and the formulation ratio of the UV-polymerizable compound.

Examples 13 to 18

As shown in FIG. 4, 2.0 mass % of any of the components NPA1 to NPA6 was used as the non-polymerizable viscosity-reducing agent DP in each of the coating solutions of Examples 13 to 18. Light control sheets 11 of Examples 13 to 18 were obtained in the same manner as in Example 1, except for the formulation ratio of the non-polymerizable viscosity-reducing agent DP and the formulation ratio of the UV-polymerizable compound.

Examples 19 to 30

As shown in FIGS. 4 and 5, 3.0 mass % of any of the components NPA1 to NPA12 was used as the non-polymerizable viscosity-reducing agent DP in each of the coating solutions of Examples 19 to 30. Light control sheets 11 of Examples 19 to 30 were obtained in the same manner as in Example 1, except for the formulation ratio of the non-polymerizable viscosity-reducing agent DP and the formulation ratio of the UV-polymerizable compound.

Examples 31 to 36

As shown in FIG. 6, 4.0 mass % of any of the components NPA1 to NPA6 was used as the non-polymerizable viscosity-reducing agent DP in each of the coating solutions of Examples 31 to 36. Light control sheets 11 of Examples 31 to 36 were obtained in the same manner as in Example 1, except for the formulation ratio of the non-polymerizable viscosity-reducing agent DP and the formulation ratio of the UV-polymerizable compound.

Examples 37 to 39

As shown in FIG. 6, 5.0 mass % of the component NPA3, NPA5, or NPA6 was used as the non-polymerizable viscosity-reducing agent DP in each of the coating solutions of Examples 37 to 39. Light control sheets 11 of Examples 37 to 39 were obtained in the same manner as in Example 1, except for the formulation ratio of the non-polymerizable viscosity-reducing agent DP and the formulation ratio of the UV-polymerizable compound.

Examples 40 and 41

As shown in FIG. 6, 0.3 mass % of the component NPA4 or NPA6 was used as the non-polymerizable viscosity-reducing agent DP in each of the coating solutions of Examples 40 and 41. Light control sheets 11 of Examples 40 and 41 were obtained in the same manner as in Example 1, except for the formulation ratio of the non-polymerizable viscosity-reducing agent DP and the formulation ratio of the UV-polymerizable compound.

Comparative Example 1

As shown in FIG. 7, using a coating solution not containing the non-polymerizable viscosity-reducing agent DP, a light control sheet 11 of Comparative Example 1 was obtained in the same manner as in Example 1, except for the omission of the non-polymerizable viscosity-reducing agent DP and the formulation ratio of the UV-polymerizable compound.

Comparative Examples 2 and 3

As shown in FIG. 7, using a coating solution not containing the non-polymerizable viscosity-reducing agent DP and containing 0.5 mass % of the component MA1 as a polymerizable additive, a light control sheet 11 of Comparative Example 2 was obtained in the same manner as in Example 1, except for the omission of the non-polymerizable viscosity-reducing agent DP, the addition of the polymerizable additive, and the formulation ratio of the UV-polymerizable compound.

Further, using a coating solution not containing the non-polymerizable viscosity-reducing agent DP and containing 4.0 mass % of the component MA1 as a polymerizable additive, a light control sheet 11 of Comparative Example 3 was obtained in the same manner as in Example 1, except for the omission of the non-polymerizable viscosity-reducing agent DP, the addition of the polymerizable additive, and the formulation ratio of the UV-polymerizable compound.

Comparative Examples 4 and 5

As shown in FIG. 7, using a coating solution not containing the non-polymerizable viscosity-reducing agent DP and containing 0.5 mass % of the component MA2 as a polymerizable additive, a light control sheet 11 of Comparative Example 4 was obtained in the same manner as in Example 1, except for the omission of the non-polymerizable viscosity-reducing agent DP, the addition of the polymerizable additive, and the formulation ratio of the UV-polymerizable compound.

Further, using a coating solution not containing the non-polymerizable viscosity-reducing agent DP and containing 4.0 mass % of the component MA2 as a polymerizable additive, a light control sheet 11 of Comparative Example 5 was obtained in the same manner as in Example 1, except for the omission of the non-polymerizable viscosity-reducing agent DP, the addition of the polymerizable additive, and the formulation ratio of the UV-polymerizable compound.

Comparative Examples 6 and 7

As shown in FIG. 7, using a coating solution not containing the non-polymerizable viscosity-reducing agent DP and containing 0.5 mass % of the component MA3 as a polymerizable additive, a light control sheet 11 of Comparative Example 6 was obtained in the same manner as in Example 1, except for the omission of the non-polymerizable viscosity-reducing agent DP, the addition of the polymerizable additive, and the formulation ratio of the UV-polymerizable compound.

Further, using a coating solution not containing the non-polymerizable viscosity-reducing agent DP and containing 4.0 mass % of the component MA3 as a polymerizable additive, a light control sheet 11 of Comparative Example 7 was obtained in the same manner as in Example 1, except for the omission of the non-polymerizable viscosity-reducing agent DP, the addition of the polymerizable additive, and the formulation ratio of the UV-polymerizable compound.

Evaluation

Using the light control sheets 11 of Examples 1 to 41 and Comparative Examples 1 to 7, the haze of the light control sheet 11 in an opaque state (when no voltage was applied) and the haze of the light control sheet 11 in a transparent state (when voltage was applied) were each measured at temperatures of −20° C., −10° C., 0° C., 23° C., 90° C., and 100° C.

Using the light control sheets 11 of Examples 1 to 41 and Comparative Examples 1 to 7, the time required for each light control sheet 11 to switch from the opaque state to the transparent state, which was regarded as an ON operation, was measured at temperatures of −20° C., −10° C., and 23° C. The time required for switching from the opaque state to the transparent state is the time from the start of applying the drive voltage until the haze of the light control sheet 11 stabilizes.

Using the light control sheets 11 of Examples 1 to 41 and Comparative Examples 1 to 7, the time required for each light control sheet 11 to switch from the transparent state to the opaque state, which was regarded as an OFF operation, was measured at temperatures of −20° C., −10° C., and 23° C. The time required for switching from the transparent state to the opaque state is the time from the stop of applying the drive voltage until the haze of the light control sheet 11 stabilizes.

It was confirmed that the ON operation at −20° C. was 5 seconds or less in all of the Examples 1 to 41, whereas the ON operation at −20° C. was 7 seconds or more in all of Comparative Examples 1 to 7. As a result, it was confirmed that the responsiveness of the ON operation at −20° C. could be enhanced by adding any of the components NPA1 to NPA12 as the non-polymerizable viscosity-reducing agent DP, as compared with when not adding the non-polymerizable viscosity-reducing agent DP and when adding a polymerizable additive.

It was also confirmed that the deviation between the ON operation at −20° C. and the ON operation at 23° C. was 4 seconds or less in all of Examples 1 to 41, whereas it was 6 seconds or more in all of Comparative Examples 1 to 7. As a result, it was confirmed that the degree of reduction in the responsiveness of the ON operation due to the decrease in temperature could be suppressed by adding any of the components NPA1 to NPA12 as the non-polymerizable viscosity-reducing agent DP, as compared with when not adding the non-polymerizable viscosity-reducing agent DP and when adding a polymerizable additive.

Further, it was confirmed that the haze in the transparent state was 6% or less in all of Examples 1 to 39, whereas the haze in the transparent state was 7% or more in both of Examples 40 and 41. As a result, it was confirmed that when the ratio of the non-polymerizable viscosity-reducing agent DP to the weight of the non-polymerizable liquid crystal compound LCM was 1% or more, the haze in the transparent state could be suppressed.

From the comparison between the haze in the transparent state in Examples 7 to 39 and the haze in the transparent state in Examples 1 to 6, it was confirmed that when the ratio of the non-polymerizable viscosity-reducing agent DP to the weight of the non-polymerizable liquid crystal compound LCM was 2% or more, the haze in the transparent state could be further suppressed.

It was confirmed that the haze in the opaque state at 100° C. was 85% or more in Examples 33, 35, and 36, whereas the haze in the opaque state at 100° C. was 83% or less in Examples 37, 38, and 39. As a result, it was confirmed that when the ratio of the non-polymerizable viscosity-reducing agent DP to the weight of the non-polymerizable liquid crystal compound LCM was 8% or less, the reduction in haze in the opaque state could be suppressed.

It was also confirmed that the deviation between the haze in the opaque state at −20° C. and the haze in the opaque state at 23° C. was 10% or less in all of Examples 33, 35, and 36, whereas it was 12% or more in all of Examples 37, 38, and 39. As a result, it was confirmed that when the ratio of the non-polymerizable viscosity-reducing agent DP to the weight of the non-polymerizable liquid crystal compound LCM was 8% or less, the degree of reduction in haze in the opaque state due to the decrease in temperature could be suppressed.

It was confirmed that the haze in the transparent state at −20° C. in Examples 19 to 23 was lower than the haze in the transparent state at −20° C. in Examples 24 and 27 to 30. It was also confirmed that the haze in the opaque state at 100° C. in Examples 19 to 23 was higher than the haze in the opaque state at 100° C. in Examples 25 to 27. As a result, when it is necessary to enhance the orientational order of the non-polymerizable liquid crystal compound LCM at a low ambient temperature, it is preferable to use the components NPA1 to NPA6 among the non-polymerizable liquid crystal compounds LCM. Further, when it is necessary to increase the fluidity of the non-polymerizable liquid crystal compound LCM at a high ambient temperature, it is preferable to use the components NPA1 to NPA6 among the non-polymerizable liquid crystal compounds LCM.

According to the above-described embodiment, the advantageous effects listed below can be achieved.

(1) With a configuration in which the liquid crystal composition 31LC contains a non-polymerizable viscosity-reducing agent DP represented by the above formulas (1) to (3), the alkyl group, which is a non-polar group, intervenes between the non-polymerizable liquid crystal compounds LCM to weaken intermolecular interactions in the non-polymerizable liquid crystal compounds LCM. As a result, it is possible to increase the responsiveness of the light transmittance at low ambient temperatures, such as −20° C.

(2) The low-molecular-weight structures represented by the above formulas (1) to (3) are preferably dispersed from the polymer of the UV-polymerizable compound, that is, phase-separated from the organic polymer layer 31P as liquid crystal particles.

(3) When the non-polymerizable viscosity-reducing agent DP is adipate, as in the components NPA1 to NPA6, it is possible to suppress the deterioration in the orientational order of the non-polymerizable liquid crystal compound LCM at low ambient temperatures, such as −20° C.

(4) When the ratio of the weight of the non-polymerizable viscosity-reducing agent DP to the weight of the non-polymerizable liquid crystal compound LCM is 1% or more, it is possible to suppress the deterioration in the orientational order of the non-polymerizable liquid crystal compound LCM at low ambient temperatures, such as −20° C.

(5) When the ratio of the weight of the non-polymerizable viscosity-reducing agent DP to the weight of the non-polymerizable liquid crystal compound LCM is 2% or more and 8% or less, it also facilitates the control of the transition of the non-polymerizable liquid crystal compound LCM to a disordered phase at high ambient temperatures, such as 100° C.

According to the above embodiment and examples, the following technical ideas can be derived.

In the light control sheet, the production method thereof, and the liquid crystal composition for polymer dispersion, the liquid crystal composition may contain diisodecyl adipate as a non-polymerizable viscosity-reducing agent, and the ratio of the weight of the non-polymerizable viscosity-reducing agent to the weight of the non-polymerizable liquid crystal compound may be 1% or more and 8% or less. Further, in the light control sheet, the production method thereof, and the liquid crystal composition for polymer dispersion, the liquid crystal composition may contain one selected from a group of dibutyl adipate, dioctyl adipate, and diisononyl adipate as a non-polymerizable viscosity-reducing agent, and the ratio of the weight of the non-polymerizable viscosity-reducing agent to the weight of the non-polymerizable liquid crystal compound may be 1% or more and 8% or less. In the light control sheet, the production method thereof, and the liquid crystal composition for polymer dispersion, the liquid crystal composition may contain one selected from a group of diisodecyl adipate, dibutyl adipate, dioctyl adipate, and diisononyl adipate as a non-polymerizable viscosity-reducing agent, and the ratio of the weight of the non-polymerizable viscosity-reducing agent to the weight of the non-polymerizable liquid crystal compound may be 1% or more and 8% or less.

Further, in the light control sheet, the production method thereof, and the liquid crystal composition for polymer dispersion, the ratio of the weight of the organic polymer layer to the total weight of the organic polymer layer and the liquid crystal composition may be 30 mass % or more and 60 mass % or less. In addition, in the light control sheet, the production method thereof, and the liquid crystal composition for polymer dispersion, the ratio of the weight of the non-polymerizable viscosity-reducing agent to the total weight of the non-polymerizable liquid crystal compound and the non-polymerizable viscosity-reducing agent may be 2 mass % or more and 6 mass % or less.

Among FIGS. 3 to 7, as shown in the OFF operation of the component NPA4 at −10° C., when the weight of the non-polymerizable viscosity-reducing agent relative to the weight of the liquid crystal composition is 0.3%, in other words, when the weight of the non-polymerizable viscosity-reducing agent relative to the weight of the non-polymerizable liquid crystal compound is 0.6%, the OFF operation takes more time, whereas when the weight of the non-polymerizable viscosity-reducing agent relative to the weight of the liquid crystal composition is 0.5% or more, in other words, when the weight of the non-polymerizable viscosity-reducing agent relative to the weight of the non-polymerizable liquid crystal compound is 1% or more, the time required for the OFF operation can be shortened more rapidly. As in each of the above configurations, when one selected from a group of diisodecyl adipate, dibutyl adipate, dioctyl adipate, and diisononyl adipate is contained as a non-polymerizable viscosity-reducing agent, and when the weight of the non-polymerizable viscosity-reducing agent relative to the weight of the non-polymerizable liquid crystal compound is 1% or more and 8% or less, the time required for the OFF operation can be shortened more rapidly. Even when the ratio of the weight of the non-polymerizable viscosity-reducing agent to the total weight of the non-polymerizable liquid crystal compound and the non-polymerizable viscosity-reducing agent is 2 mass % or more and 6 mass % or less, the time required for the OFF operation can also be shortened more rapidly.

X in formula (1) is a linear alkyl group having 1 or more and 6 or fewer carbon atoms, and $R^1$, $R^2$, and $R^3$ in formula (1) may be bonded to one carbon located at the end of the linear alkyl group or may be bonded separately to one carbon located at the end of the linear alkyl group and to another carbon. X in formula (1) is a linear alkyl group having 1 or more and 6 or fewer carbon atoms, and $R^1$, $R^2$, and $R^3$ in formula (1) may be bonded to different carbons other than the terminal carbon of the linear alkyl group. X in formula (1) is one aryl group, and one of $R^1$, $R^2$, and $R^3$ in formula (1) may be bonded to one carbon of the aryl group, and the other two of $R^1$, $R^2$, and $R^3$ may be bonded to another one carbon of the aryl group. X in formula (1) is one aryl group, and $R^1$, $R^2$, and $R^3$ in formula (1) may be bonded to different carbons of the aryl group.

A light control sheet includes a first transparent electrode layer, a second transparent electrode layer, and a light control layer sandwiched between the first transparent electrode layer and the second transparent electrode layer. The orientation state of a non-polymerizable liquid crystal compound contained in the light control layer changes the light transmittance of the light control sheet following changes in the potential difference between the two transparent electrode layers. For example, when the orientational order of the non-polymerizable liquid crystal compound is constructed, the light control sheet shows high light transmittance. When the major axis direction of the non-polymerizable liquid crystal compound is disordered, the light control sheet shows low light transmittance (see, for example, JP 2018-45135 A).

On the other hand, the responsiveness of the light transmittance to changes in the potential difference between the two transparent electrode layers depends on the ambient temperature at which the light control sheet is installed. The wider the ambient temperature range over which the light transmittance changes within a predetermined time after switching the potential difference, the wider the field of application of the light control sheet. In particular, the field of application requiring driving in cold climates requires that the light transmittance changes within a predetermined time at a low ambient temperature. For example, when the light control sheet is attached to a vehicle window glass, the ambient temperature at which the light control sheet is installed is lower than that for items in the cabin. If the time required to change the light transmittance can be reduced in low-temperature environments, the suitability of light control sheets for vehicles can be enhanced.

A light control sheet according to an embodiment of the present invention includes: an organic polymer layer that partitions multiple voids; and a liquid crystal composition that contains a non-polymerizable liquid crystal compound and fills the voids. The light control sheet changes the transmittance to visible light by driving the non-polymerizable liquid crystal compound, and the liquid crystal composition includes a non-polymerizable viscosity-reducing agent represented by the following formula (1). In formula (1), X is a linear or branched alkyl group having 1 or more and 6 or fewer carbon atoms or an aryl group; $R^1$, $R^2$, and $R^3$ are each independently a hydrogen atom or a functional group represented by formula (2); and $r^4$ is a linear or branched alkyl group having 1 or more and 10 or fewer carbon atoms or an ether group. In formula (2), $r^5$ is a linear or branched alkyl group having 1 or more and 10 or fewer carbon atoms or an ether group.

Chemical Formula 1 formula (1)

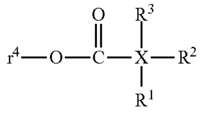

Chemical Formula 2 formula (2)

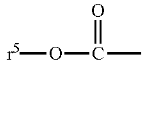

A light control sheet according to an embodiment of the present invention includes: an organic polymer layer that partitions voids; and a liquid crystal composition that contains a non-polymerizable liquid crystal compound and fills the voids. The light control sheet changes the transmittance to visible light by driving the non-polymerizable liquid crystal compound, and the liquid crystal composition includes a non-polymerizable viscosity-reducing agent represented by the following formula (3). In formula (3), $r^6$, $r^7$, and $r^8$ are each independently a linear alkyl group having 3 or more and 8 or fewer carbon atoms.

Chemical Formula 3 formula (3)

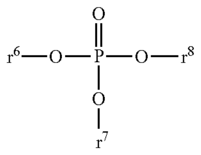

A method for producing a light control sheet which includes an organic polymer layer partitioning voids, and a liquid crystal composition containing a non-polymerizable liquid crystal compound and filling the voids, and changes the transmittance to visible light by driving the non-polymerizable liquid crystal compound, includes: phase-separating liquid crystal particles made of the liquid crystal composition from the organic polymer layer by polymerizing a UV-curable compound in a layer containing the liquid crystal composition and the UV-curable compound. The liquid crystal composition includes a non-polymerizable viscosity-reducing agent represented by the above formula (1), the ratio of the weight of the organic polymer layer to the total weight of the organic polymer layer and the liquid crystal composition is 30 mass % or more and 60 mass % or less, and the ratio of the weight of the non-polymerizable viscosity-reducing agent to the weight of the non-polymerizable liquid crystal compound is 1% or more and 8% or less.

A method for producing a light control sheet which includes an organic polymer layer partitioning voids, and a liquid crystal composition containing a non-polymerizable liquid crystal compound and filling the voids, and changes the transmittance to visible light by driving the non-polymerizable liquid crystal compound, includes: phase-separating liquid crystal particles made of the liquid crystal composition from the organic polymer layer by polymerizing a UV-curable compound in a layer containing the liquid crystal composition and the UV-curable compound. The liquid crystal composition includes a non-polymerizable viscosity-reducing agent represented by the above formula (3), the ratio of the weight of the organic polymer layer to the total weight of the organic polymer layer and the liquid crystal composition is 30 mass % or more and 60 mass % or less, and the ratio of the weight of the non-polymerizable viscosity-reducing agent to the weight of the non-polymerizable liquid crystal compound is 1% or more and 8% or less.

A liquid crystal composition for polymer dispersion according to an embodiment of the present invention is a liquid crystal composition for polymer dispersion phase-separated from an organic polymer layer, which is a polymer, by polymerizing a UV-curable compound in a layer containing a liquid crystal composition and the UV-curable compound. The liquid crystal composition includes a non-polymerizable liquid crystal compound and a non-polymerizable viscosity-reducing agent represented by the above formula (1), the ratio of the weight of the UV-curable compound to the total weight of the UV-curable compound and the liquid crystal composition is 30 mass % or more and 60 mass % or less, and the ratio of the weight of the non-polymerizable viscosity-reducing agent to the weight of the non-polymerizable liquid crystal compound is 1% or more and 8% or less.

A liquid crystal composition for polymer dispersion according to an embodiment of the present invention is a liquid crystal composition for polymer dispersion phase-separated from an organic polymer layer, which is a polymer, by polymerizing a UV-curable compound in a layer containing a liquid crystal composition and the UV-curable compound. The liquid crystal composition includes a non-polymerizable liquid crystal compound and a non-polymerizable viscosity-reducing agent represented by the above formula (3), the ratio of the weight of the UV-curable compound to the total weight of the UV-curable compound and the liquid crystal composition is 30 mass % or more and 60 mass % or less, and the ratio of the weight of the non-polymerizable viscosity-reducing agent to the weight of the non-polymerizable liquid crystal compound is 1% or more and 8% or less.

With each of the above configurations, the terminal alkyl group of the non-polymerizable viscosity-reducing agent can easily intervene between adjacent non-polymerizable liquid crystal compounds due to interactions between electron localization in the non-polymerizable liquid crystal compound and electron localization in the non-polymerizable viscosity-reducing agent. The intervention of the alkyl group, which is a non-polar group, between the non-polymerizable liquid crystal compounds weakens intermolecular interactions in the non-polymerizable liquid crystal compounds. As a result, it is possible to increase the responsiveness of the light transmittance at low ambient temperatures, such as −20° C.

In addition, the configuration in which the voids partitioned by the organic polymer layer are filled with the liquid crystal composition is formed by using a photopolymerizable compound and a liquid crystal composition for forming the organic polymer layer through the polymerization of the photopolymerizable compound to phase-separate the liquid crystal composition from the organic polymer layer. In this case, the non-polymerizable viscosity-reducing agent is preferably phase-separated from the organic polymer layer. Further, the low-molecular-weight structures represented by the above formulas (1) to (3) are also preferably dispersed from the polymer of the photopolymerizable compound, that is, phase-separated from the organic polymer layer.

In the light control sheet, the ratio of the weight of the organic polymer layer to the total weight of the organic polymer layer and the liquid crystal composition may be 30 mass % or more and 60 mass % or less.

In the light control sheet, the ratio of the weight of the non-polymerizable viscosity-reducing agent to the weight of the non-polymerizable liquid crystal compound may be 1% or more and 8% or less. With this configuration, it is possible to suppress the deterioration in the orientational order of the non-polymerizable liquid crystal compound at low ambient temperatures, such as −20° C. Further, with this configuration, the feasibility of obtaining the above effects can be increased, and it also facilitates the control of the transition of the non-polymerizable liquid crystal compound to a disordered phase at high ambient temperatures, such as 100° C.

In the light control sheet, X in formula (1) may be a linear alkyl group having 1 or more and 6 or fewer carbon atoms, $R^1$ in formula (1) may be a functional group represented by formula (2), and $R^2$ and $R^3$ in formula (1) may be each independently a hydrogen atom.

In the light control sheet, the NI point of the non-polymerizable liquid crystal compound may be 100° C. or more and 145° C. or less.

In the light control sheet, the non-polymerizable viscosity-reducing agent may be one selected from a group of diisodecyl adipate, dibutyl adipate, dioctyl adipate, bis(2-butoxyethyl) adipate, and diisononyl adipate. With this configuration, it is possible to suppress the deterioration in the orientational order of the non-polymerizable liquid crystal compound at low ambient temperatures, such as −20° C.

In the light control sheet, the ratio of the weight of all of the non-polymerizable viscosity-reducing agents contained in the liquid crystal composition to the total weight of the non-polymerizable liquid crystal compound and the non-polymerizable viscosity-reducing agents may be 2 mass % or more and 6 mass % or less.

The light control sheet may further include a first transparent electrode layer and a second transparent electrode layer, wherein the organic polymer layer is located between the transparent electrode layers, the liquid crystal composition is liquid crystal particles phase-separated from the organic polymer layer, and the light control sheet transitions from a transparent state to an opaque state by stopping voltage application between the transparent electrode layers. With this configuration, it is possible to increase, in the normal-type light control sheet, the responsiveness of the light transmittance at low ambient temperatures, such as −20° C.

The light control sheet may further include a first transparent electrode layer and a second transparent electrode layer, wherein the organic polymer layer is located between the transparent electrode layers, the liquid crystal composition is liquid crystal particles phase-separated from the organic polymer layer, and the light control sheet transitions from a transparent state to an opaque state by voltage application between the transparent electrode layers. With this configuration, it is possible to increase, in the reverse-type light control sheet, the responsiveness of the light transmittance at low ambient temperatures, such as −20° C.

Embodiments of the present invention include a light control sheet that reduces the time required to change the light transmittance in response to changes in the potential difference, a method for producing the light control sheet, and a liquid crystal composition for polymer dispersion.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising:

an organic polymer layer partitioning a plurality of voids; and a liquid crystal composition comprising a non-polymerizable liquid crystal compound and filling the voids, wherein the light control sheet is configured to change transmittance to visible light by driving the non-polymerizable liquid crystal compound, the liquid crystal composition includes a non-polymerizable viscosity-reducing agent which is at least one compound selected from the group consisting of diisodecyl adipate, dibutyl adipate, dioctyl adipate, bis(2-butoxyethyl) adipate, and diisononyl adipate, and the non-polymerizable liquid crystal compound has an NI point a nematic-isotropic transition temperature in a range of 100° C. to 145° C.

2. The light control sheet according to claim 1, wherein a ratio of a weight of the organic polymer layer to a total weight of the organic polymer layer and the liquid crystal composition is in a range of 30 mass % to 60 mass %.

3. The light control sheet according to claim 1, wherein a ratio of a weight of the non-polymerizable viscosity-reducing agent to a weight of the non-polymerizable liquid crystal compound is in a range of 1% to 8%.

4. The light control sheet according to claim 1, wherein a ratio of a weight of all of the non-polymerizable viscosity-reducing agents in the liquid crystal composition to a total weight of the non-polymerizable liquid crystal compound and the non-polymerizable viscosity-reducing agents is in a range of 2 mass % to 6 mass %.

5. The light control sheet according to claim 1, further comprising:

a first transparent electrode layer; and a second transparent electrode layer positioned such that the organic polymer layer is formed between the first and second transparent electrode layers, wherein the liquid crystal composition is liquid crystal particles phase-separated from the organic polymer layer, and the light control sheet is configured to transition from a transparent state to an opaque state by stopping application of a voltage between the first and second transparent electrode layers.

6. The light control sheet according to claim 1, further comprising:

a first transparent electrode layer; and a second transparent electrode layer positioned such that the organic polymer layer is formed between the first and second transparent electrode layers, wherein the liquid crystal composition is liquid crystal particles phase-separated from the organic polymer layer, and the light control sheet is configured to transition from a transparent state to an opaque state by applying a voltage between the first and second transparent electrode layers.

7. A method for producing a light control sheet, comprising:

phase-separating liquid crystal particles comprising a liquid crystal composition including a non-polymerizable liquid crystal compound from an organic polymer layer by polymerizing a UV-curable compound in a layer including the liquid crystal composition and the UV-curable compound such that the organic polymer layer partitions a plurality of voids and the liquid crystal composition fills the voids, wherein the liquid crystal composition includes a non-polymerizable viscosity-reducing agent which is at least one compound selected from the group consisting of diisodecyl adipate, dibutyl adipate, dioctyl adipate, bis(2-butoxyethyl) adipate, and diisononyl adipate, a ratio of a weight of the organic polymer layer to a total weight of the organic polymer layer and the liquid crystal composition is in a range of 30 mass % to 60 mass % or less, a ratio of a weight of the non-polymerizable viscosity-reducing agent to a weight of the non-polymerizable liquid crystal compound is in a range of 1% to 8%, the light control sheet is configured to change transmittance to visible light by driving the non-polymerizable liquid crystal compound, and the non-polymerizable liquid crystal compound has a nematic-isotropic transition temperature in a range of 100° C. to 145° C.

8. A liquid crystal composition for polymer dispersion, comprising:

a UV-curable compound;

a non-polymerizable liquid crystal compound; and a non-polymerizable viscosity-reducing agent which is at least one compound selected from the group consisting of diisodecyl adipate, dibutyl adipate, dioctyl adipate, bis(2-butoxyethyl) adipate, and diisononyl adipate, wherein a ratio of a weight of the UV-curable compound to a total weight of the UV-curable compound and the liquid crystal composition is in a range of 30 mass % to 60 mass %, a ratio of a weight of the non-polymerizable viscosity-reducing agent to a weight of the non-polymerizable liquid crystal compound is in a range of 1% to 8%, the liquid crystal composition is phase-separated from an organic polymer layer by polymerizing the UV-curable compound in a layer including the liquid crystal composition and the UV-curable compound, and the non-polymerizable liquid crystal compound has a nematic-isotropic transition temperature in a range of 100° C. to 145° C.

9. The light control sheet according to claim 2, further comprising:

a first transparent electrode layer; and a second transparent electrode layer positioned such that the organic polymer layer is formed between the first and second transparent electrode layers, wherein the liquid crystal composition is liquid crystal particles phase-separated from the organic polymer layer, and the light control sheet is configured to transition from a transparent state to an opaque state by stopping application of a voltage between the first and second transparent electrode layers.

10. The light control sheet according to claim 1, wherein the non-polymerizable viscosity-reducing agent is at least one compound selected from the group consisting of diisodecyl adipate, dibutyl adipate, bis(2-butoxyethyl) adipate, and diisononyl adipate.

11. The method of claim 7, wherein the non-polymerizable viscosity-reducing agent is at least one compound selected from the group consisting of diisodecyl adipate, dibutyl adipate, bis(2-butoxyethyl) adipate, and diisononyl adipate.

12. The liquid crystal composition for polymer dispersion of claim 8, wherein the non-polymerizable viscosity-reducing agent is at least one compound selected from the group consisting of diisodecyl adipate, dibutyl adipate, bis(2-butoxyethyl) adipate, and diisononyl adipate.

* * * * *